US011295735B1

(12) United States Patent
Anuar et al.

(10) Patent No.: US 11,295,735 B1
(45) Date of Patent: Apr. 5, 2022

(54) CUSTOMIZING VOICE-CONTROL FOR DEVELOPER DEVICES

(71) Applicant: Amazon Technologies, Inc., Seattle, WA (US)

(72) Inventors: Raphael Adam Anuar, Seattle, WA (US); Zoe Adams, Orange County, CA (US); Shah Samir Pravinchandra, Pleasanton, CA (US); Idris Abbas Saylawala, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 197 days.

(21) Appl. No.: 15/840,457

(22) Filed: Dec. 13, 2017

(51) Int. Cl.
*G10L 15/00* (2013.01)
*G10L 15/26* (2006.01)
*G10L 15/22* (2006.01)
*G06F 3/16* (2006.01)
*G10L 15/18* (2013.01)
*G10L 15/30* (2013.01)
*H04L 67/02* (2022.01)

(52) U.S. Cl.
CPC .............. *G10L 15/22* (2013.01); *G06F 3/167* (2013.01); *G10L 15/1815* (2013.01); *G10L 15/30* (2013.01); *G10L 2015/223* (2013.01); *H04L 67/02* (2013.01)

(58) Field of Classification Search
CPC ... G10L 15/22; G10L 2015/088; G10L 15/30; G10L 15/32; G10L 17/22; G10L 2015/0638; G10L 15/063; G10L 15/26; G10L 2015/223; G10L 15/1815; G06F 3/167; G06F 16/3344; G06F 17/2775; G06F 2203/0381; G06F 16/90332; G06F 17/278; H04L 67/02
See application file for complete search history.

(56) References Cited

U.S. PATENT DOCUMENTS

| | | | | |
|---|---|---|---|---|
| 9,275,637 | B1 * | 3/2016 | Salvador | G10L 15/01 |
| 9,972,312 | B2 * | 5/2018 | Hilal | G06F 17/271 |
| 2006/0287854 | A1 * | 12/2006 | Smolenski | G10L 15/26 |
| | | | | 704/231 |
| 2008/0215577 | A1 * | 9/2008 | Takagi | G06F 17/278 |
| 2009/0187410 | A1 * | 7/2009 | Wilpon | G10L 15/22 |
| | | | | 704/270.1 |
| 2010/0169075 | A1 * | 7/2010 | Raffa | G06F 17/2775 |
| | | | | 704/9 |

(Continued)

Primary Examiner — Michael Ortiz-Sanchez
(74) Attorney, Agent, or Firm — Lee & Hayes, P.C.

(57) ABSTRACT

This disclosure describes, in part, techniques implemented by a speech-processing system for providing an extensible skill-interface component to facilitate voice-control of third-party developer devices. The speech-processing system may provide the skill-interface component to third-party device developers using a web-based portal through which the skill interfaces may be created to voice-enable third-party devices having unique capabilities. For instance, a skill interface may define events, such as voice commands of a user, which map to directives configured to cause the third-party devices to perform an operation that is responsive to the event. In this way, the speech-processing system may receive audio data representing a voice command of a user in an environment of a third-party device, and return a directive to cause the third-party device to perform an operation responsive to the voice command.

21 Claims, 15 Drawing Sheets

(56) References Cited

U.S. PATENT DOCUMENTS

| | | | |
|---|---|---|---|
| 2012/0036552 A1* | 2/2012 | Dare | H04L 41/0253 |
| | | | 726/1 |
| 2014/0012586 A1* | 1/2014 | Rubin | G10L 25/51 |
| | | | 704/273 |
| 2015/0006182 A1* | 1/2015 | Schmidt | G10L 15/30 |
| | | | 704/275 |
| 2015/0033130 A1* | 1/2015 | Scheessele | G06F 3/013 |
| | | | 715/728 |
| 2015/0254058 A1* | 9/2015 | Klein | G06F 3/167 |
| | | | 704/275 |
| 2015/0302850 A1* | 10/2015 | Lebrun | G06F 17/279 |
| | | | 704/243 |
| 2016/0055573 A1* | 2/2016 | Chen | G06Q 30/0641 |
| | | | 705/26.41 |
| 2016/0117146 A1* | 4/2016 | Raux | G06F 3/167 |
| | | | 715/716 |
| 2016/0218884 A1* | 7/2016 | Ebrom | D06F 33/02 |
| 2016/0335056 A1* | 11/2016 | Neale | H04W 4/14 |
| 2017/0201850 A1* | 7/2017 | Raleigh | H04W 4/50 |
| 2017/0206059 A1* | 7/2017 | Yang | G06F 3/167 |
| 2017/0230709 A1* | 8/2017 | Van Os | G06F 16/73 |
| 2017/0256256 A1* | 9/2017 | Wang | G10L 15/30 |
| 2017/0269816 A1* | 9/2017 | Bradley | G10L 15/22 |
| 2018/0295176 A1* | 10/2018 | Sundaresan | H04L 67/04 |
| 2018/0337799 A1* | 11/2018 | Levi | H04W 76/14 |
| 2019/0132264 A1* | 5/2019 | Jafar Ali | G06F 17/279 |
| 2019/0164556 A1* | 5/2019 | Weber | G10L 15/34 |

\* cited by examiner

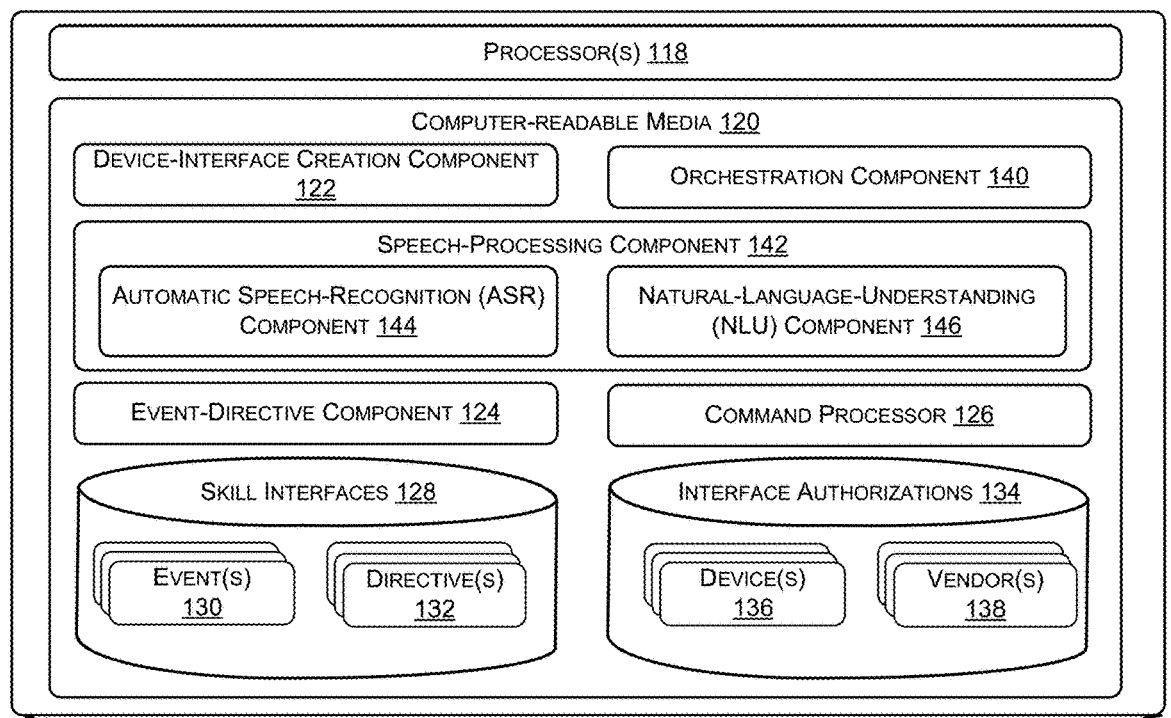
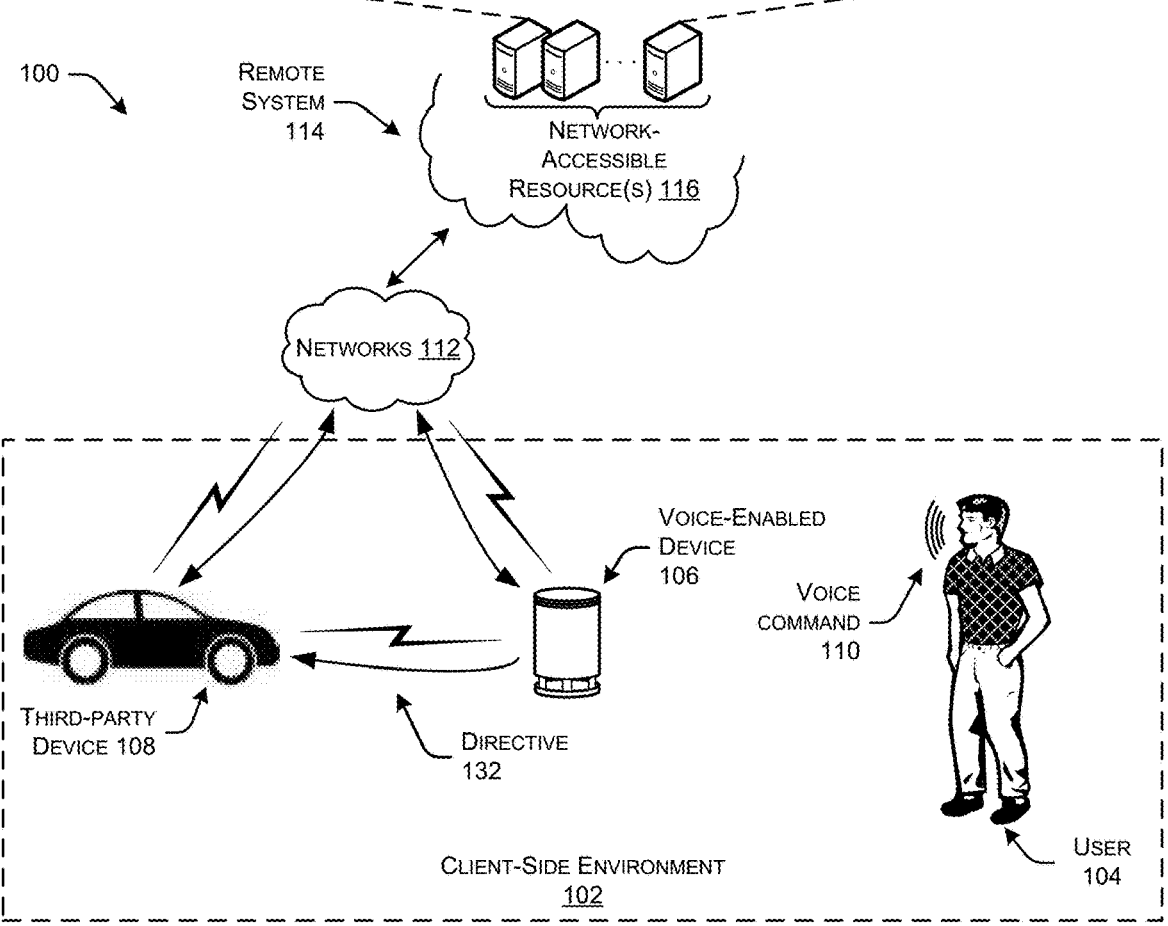
FIG. 1

US 11,295,735 B1

CUSTOMIZING VOICE-CONTROL FOR DEVELOPER DEVICES

BACKGROUND

As the capabilities of computing devices continue to evolve, many different ways have been introduced to allow users to interact with computing devices, such as through mechanical devices (e.g., keyboards, mice, etc.), touch screens, motion, and gesture. Many computing devices are now capable of receiving and responding to voice commands, including portable communication devices, appliances, automobiles, wearable devices, and so forth. Often, due to the resource-intensive nature of speech-processing, remote speech-processing systems receive audio signals from voice-enabled devices that represent voice commands, process the audio signals, and send back instructions to the devices to perform operations requested in the voice commands. Due to the usefulness of voice-enabled devices, device developers continue to attempt to voice-enable their devices. However, the resources and time required to extend speech-processing to devices often prevents device developers from voice-enabling their devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 illustrates a schematic diagram of an illustrative environment in which a third-party device developer may create a skill interface for unique capabilities of a third-party device, and a user may control the third-party device using voice commands.

DETAILED DESCRIPTION

Figure 2:
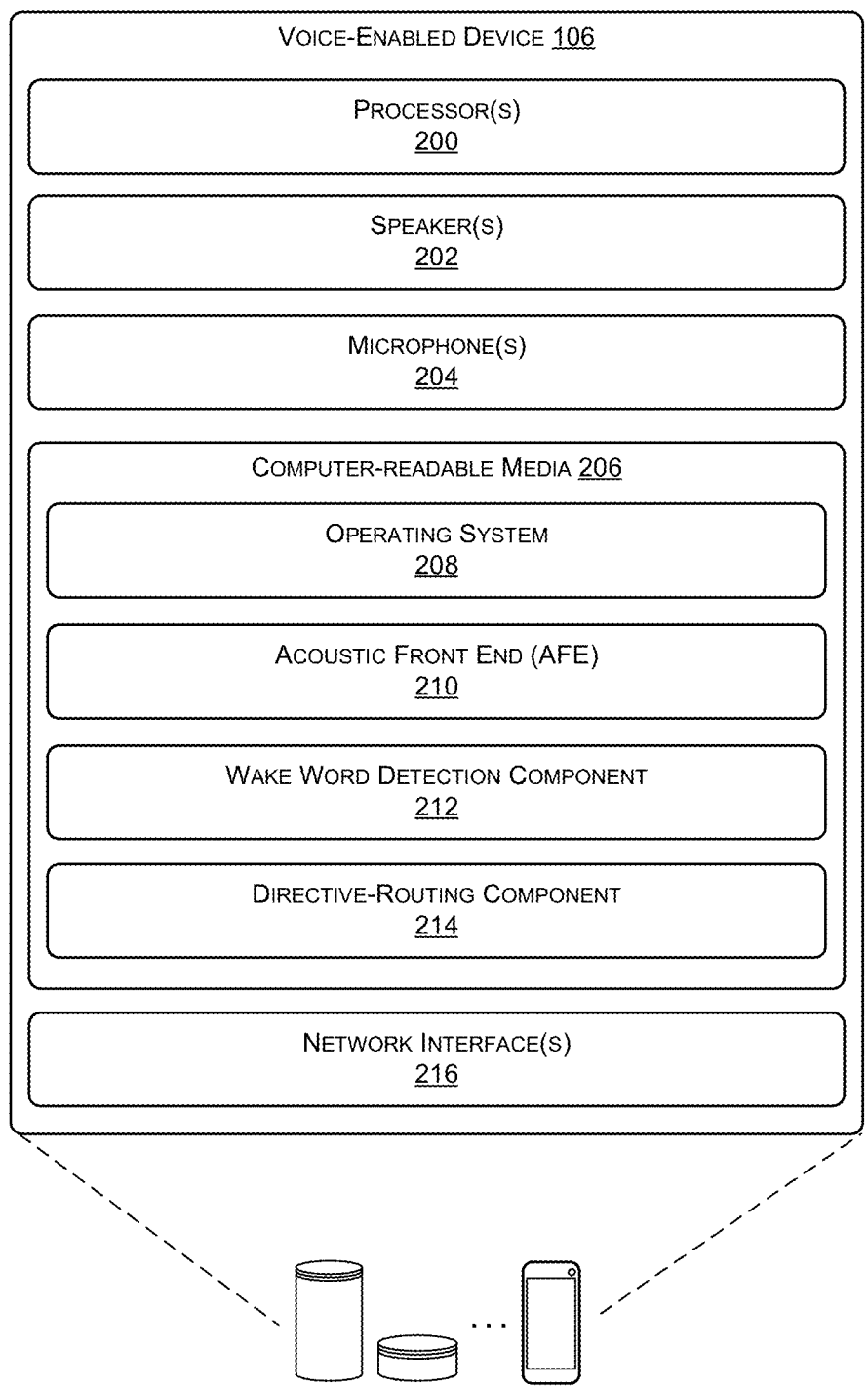
FIG. 2 illustrates a block diagram of an example architecture of a voice-enabled device which detects voice commands, generates audio data representing the voice commands, and transmits the audio data to a remote speech-processing system. The voice-enabled device may further receive directives responsive to the voice commands for controlling a third-party device.

With the proliferation of voice-enabled computing devices, e.g., "voice-enabled devices," users are able to interact with more of their computing devices through speech. For instance, a user may issue a command via a speech utterance to a voice-enabled device to perform an operation, such as turning on/off an appliance, streaming music, performing a telephone call, etc. Due to the usefulness of these voice-enabled devices, it is desirable to have all devices that a user interacts with be voice-enabled devices available for control using voice commands. In light of this, device developers continue to attempt to implement voice control in their devices. However, there is a considerable amount of resources and knowledge required to implement voice control for devices. Currently, various companies (e.g., Amazon, Google, Apple, etc.) design and offer voice-enabled devices for use by their customers. These voice-enabled devices generally include microphones for capturing user speech, speakers for outputting audio such as responses to the user speech, and network interfaces for communicating over networks. Using these hardware components, these voice-enabled devices have various device capabilities and provide services to the customers, such as streaming music, conducting phone calls, scheduling appointments, setting alarms or timers, performing online shopping, and so forth.

These devices are often configured to serve as an interface or "middle man" between a user and a remote speech-processing system (e.g., "cloud-based system," "software as a service (SaaS)," etc.). In this way, the more intensive processing involved in understanding and responding to the voice commands or speech utterances may be performed using large amounts of resources of remote systems, which may extend battery life performance of voice-enabled devices, and also reduce the amount of hardware and/or software needed to enable a voice user interface on a client/user device. Thus, some the companies who manufacture and sell these voice-enabled devices host and maintain robust remote, and/or local, speech-processing systems to support the various device capabilities of their voice-enabled devices. For example, the speech-processing systems may be configured to process audio signals representing voice commands from a user of their voice-enabled devices using natural language processing techniques, determine an intent of the voice command, and send an instruction to the voice-enabled device to perform an operation responsive to the intent of the voice command.

As described herein, "first-party developers" and/or "first-party developer profiles" generally correspond to users, or user profiles associated with the speech-processing system, that are employees or other users (e.g., contractors) associated with companies which manage and maintain speech-processing systems (e.g., Amazon, Google, Apple, etc.). Similarly, "first-party devices" generally correspond to devices which are designed, developed, manufactured, or otherwise associated with the companies who manage the speech-processing systems (e.g., Amazon Echo, Google Home, Apple HomePod, etc.). Conversely, "third-party developers" and/or "third-party developer profiles" generally correspond to users, or user profiles, of entities which subscribe for use of the services provided by the speech-processing systems. Similarly, "third-party devices" generally correspond to devices whose design, manufacture, use, and so forth, are conducted by or under instruction from the third-party developers. For example, a third-party developer may be a vehicle company (e.g., Ford, General Motors, Toyota, etc.) who wishes to have respective devices internal to their vehicles voice-enabled using the voice-enabled systems. For example, a vehicle company may which to subscribe to voice-control services provided by the speech-processing system to control devices internal to their vehicles (e.g., windshield wipers, ignition, sunroof, etc.). Thus, in some examples the third-party devices may be manufactured or designed by a third-party developer, and in other examples, the third-party devices may be employed or used by third-party developers in their respective products. As an example, a vehicle manufacturer may buy windshield wiper systems from an external manufacturer to install in their vehicles, but subscribe to the speech-processing system in order to voice-enable control of the windshield wipers.

In light of the improved user experience that voice-enabled devices provide to users, third-party device developers may also desire to enable their devices to perform their unique device capabilities responsive to a voice command. For example, device manufacturers in automotive industries, appliance industries, wearable device industries, and so forth, wish to provide voice control for the various device capabilities of their devices. However, creating and maintaining a speech-processing system to support voice control of devices involves substantial investments in time, money, computing resources, etc. Some of these third-party device developers have worked with existing providers of voice-enabled devices in an attempt to harness the speech-processing systems for their unique third-party devices. For example, existing architectures used by first-party voice-enabled device manufacturers for performing speech-processing may be scalable to provide third-party device manufactures with accurate determinations of text included in the voice commands using automatic speech recognition (ASR) and intents of the voice commands using natural language understanding (NLU). However, third-party device manufacturers may still be required to host and maintain network-based infrastructure for processing the text data and/or intent data in order to provide a hardware, device-specific instruction to cause the respective third-party devices to perform an operation using their unique device capabilities that is responsive to the voice commands. However, these network-based infrastructures similarly require significant investments and continuous maintenance. Accordingly, third-party device developers may experience significant barriers to enabling their devices to perform responses to voice commands using their unique device capabilities.

This disclosure describes, at least in part, techniques implemented by a speech-processing system for providing an extensible skill-interface component to facilitate voice-enablement of various third-party developer devices. The skill-interface component described herein may provide an avenue, e.g., portal, through which third-party device developers may design device-specific interfaces whereby device events and responsive directives or instructions may be implemented for unique device capabilities of the third-party devices. As noted above, the operators of existing speech-processing systems may have skill interfaces configured to support capabilities of the devices that are designed and sold by the owners or operators of the speech-processing systems (e.g., first-party devices). As noted above, these types of first-party device capabilities may include, but are not limited to, streaming music, performing telephone calls, scheduling appointments, performing online shopping requests, and so forth. However, third-party device developers may wish to design or create unique skill interfaces for device skills, e.g., capabilities, which may not be supported by the first-party speech-processing system. As an example, a third-party automobile manufacture may wish to voice-enable various devices in their automobiles, such as voice-controlled windshield wipers, sun roofs, seat warmers, automatic windows, and so forth. The techniques described herein provide portals through which third-party device developers are able to create and manage unique device-capability specific interfaces to voice-enable their third-party devices.

In some examples, the speech-processing system may expose, e.g., provide, access to one or more user interfaces, such as via a website, that supports a skill-interface component which provides controls and other user interfaces to facilitate the creation of a skill interface to voice-enable third-party devices having unique device capabilities. For example, the speech-processing system may host one or more websites, or other network accessible locations, which include user interfaces that allow a developer to create a skill interface for unique device capabilities. The skill-interface component, which may receive input via the one or more user interfaces, may include various stages through which a third-party device developer creates their skill interfaces. For example, the skill-interface component may initially request the third-party developer for unique skill-interface name and a description of its use. As an example, a third-party automobile device developer may create a skill interface named "windshield wipers" to enable voice control for the specific windshield wipers used in automobiles they manufacture. In some examples, the name of the skill interface may be hardware and/or vendor specific (e.g., "Ford windshield wipers", "BMW windshield wipers", etc.), while in other examples, the names may be generic to the device type. Upon receiving a name for the skill interface which indicates the device capability that is to be voice enabled, the third-party developer may further choose an authorization regarding what types of device skills, e.g., device capabilities, the skill interface is to support. For instance, the skill interface named "windshield wipers" may have an authorization which limits the types of devices that interact with the skill interface to only windshield wipers, and/or limits which vendors/parties are able to interact with the skill interface (e.g., only Ford associated vehicle devices).

Once the third-party developer has utilized the skill-interface component to create the skill interface with an appropriate name and device authorizations, the third-party developer may proceed to create or add various events and related directives via the skill-interface component. Generally, an "event" may correspond to an activity occurring at the third-party device side which requires a corresponding "directive," such as an action or operation, be performed responsive to the event. The directives defined and input by the third-party device developer into the skill interface may be specific to the corresponding third-party device, such as commands or instructions specific to hardware of the third-party device. For instance, the directives may be written such that the third-party devices that receive the directives are able to process the directives, and perform commands responsive to the directives. As an example, a directive for the "windshield wiper" skill interface may be written such that the windshield wiper, or the vehicle computing device of the vehicle including the windshield wipers, can process the directive and cause the device driver for a motor of the windshield wipers to turn on or off. The directives may generally be written in any machine-readable code or format, such as JavaScript Object Notation (JSON), that is capable of being processed by the corresponding third-party device and/or configures the corresponding third-party device to perform an operation based on the directive. The directive, or directives, may further include fields which are readable by the third-party device to control various aspects of the third-party device. In the example of the windshield wiper, the directive may include fields to indicate a setting for the speed at which the windshield wipers are to move, a duration for which the windshield wipers are to turn on, and so forth. Thus, the skill-interface component may enable the third-party developer to create skill interfaces which include hardware, or device-specific, directives for controlling the third-party devices according to their unique capabilities.

In various examples, the third-party developers may further define various "events" which trigger corresponding directives to be generated and sent to the devices. In various examples, the events may correspond to voice commands, e.g., speech utterances, of a user which indicate that the intent of the user is to have the third-party device perform an action or operation specified in the voice command. In some examples, the skill-interface component may receive, via the developer portal, various predefined voice commands that result in particular directives being generated and ultimately sent to the third-party device. For instance, depending on the configuration of the remote speech-processing system, voice commands received at the speech-processing system may be processed to determine an intent of the voice command. As an example, the third-party developer may provide input indicating that a voice command of "please turn on my windshield wipers", and another voice command of "start my windshield wipers", may each be processed using natural language understanding techniques such that each voice command or utterance is mapped to, e.g., associated with, the same intent, which would be to have a driver for the windshield wipers turn on and move the windshield wipers. Thus, an example of an event that may trigger a corresponding directive would be a voice command mapping to an intent that is in turn mapped to a directive in the skill interface created for the third-party device. Accordingly, the third-party developer may define or provide different voice commands or utterances which are mapped to intents that in turn correspond to a directive. In this way, intents determined for voice commands may be events that trigger the generation and transmission of a directive for a third-party device.

In some examples, other types of events may occur which trigger the generation and transmission of a directive. For instance, the third-party devices may include sensors that generate sensor data indicating that an event has occurred that may trigger a directive. As an example, the vehicle which has the windshield wipers may have moisture sensors that collect moisture data indicating that the windshield of the vehicle has moisture on it. If the vehicle computing device determines that the moisture sensor data indicates moisture, or moisture over a certain threshold moisture measurement, the vehicle computing device (or another device in an environment of the vehicle computing device) may transmit an indication to the remote speech-processing system of an event occurring. The third-party developer may specify in the skill interface that a moisture event maps to a directive in the "windshield wiper" to cause a directive for turning on the windshield wipers to be generated and transmitted. In various examples, the moisture event may be mapped to the speech-processing systems to facilitate a dialogue with the user. For instance, the moisture event may initially trigger a response by the speech-processing system including an audio file that asks the user "We detected moisture on the windshield", to which the user can answer "yes" to trigger the appropriate directive, or alternatively answer "No, I am just in a vehicle wash" which may map to an intent that does not trigger the directive to turn on the windshield wipers. Accordingly, various types of events may trigger a directive, such as sensor data for the third-party devices.

In some examples, the third-party devices may include a microphone, speaker, and network interfaces for capturing voice commands of a user, transmitting audio data representing the voice commands to the remote speech-processing system, and receiving a directive generated by the corresponding skill interface to perform an action responsive to the voice command. However, in various examples the third-party devices may not include the appropriate hardware and/or software components for capturing voice commands of a user and transmitting them over particular networks. Following the example discussed herein regarding the windshield wiper skill interface, the vehicle computing device may include speakers, but the vehicle computing device may not include microphones for capturing voice commands, and/or may not include functionality to transmit audio data over certain networks (e.g., Wide Area Networks (WANs)).

In such examples, a voice-enabled device may additionally be included in an environment of the third-party device in order to perform various operations on behalf of the third-party device. For example, the voice-enabled device, which may be first-party device developed and manufactured by the owner or operator of the speech-processing system, may be configured to detect and capture voice commands from a user in the vehicle environment, and ultimately result in the vehicle computing device performing actions that are responsive to commands included in the voice commands issued by the user. The voice-enabled devices may be relatively sophisticated in some respects. For example, the voice-enabled devices may include one or more microphones and hardware, software, and/or firmware components, to detect and capture voice commands from a user. In some instances, the voice-enable devices may be configured to receive a "wake" trigger (e.g., wake word, button input, etc.) which indicates to the voice-enabled device that a user is issuing a command via a voice command. The voice-enabled device may proceed to capture, and stream, audio data representing the voice command to a network-based speech system. Thus, the voice-enabled devices described herein may be configured to detect and capture voice commands from a user.

Accordingly, in some examples a voice-enabled device in an environment of a third-party developer device may capture voice commands of a user, and send audio data representing the voice commands to the remote speech-processing system over a network. In some examples, the remote speech-processing system may return directives that are responsive to, e.g., associated with, the event (e.g., intent of the voice command) to the voice-enabled device, which in turn sends the directive to the appropriate third-party developer device. The voice-enabled devices may include one or more components or processes by which it determines which devices are to receive directives from the remote speech-processing system.

The techniques described herein affect the operations of third-party developer devices in various aspects. For instance, the techniques described herein enable third-party device developers to seamlessly and flexibly create and maintain skill interfaces at a remote speech-processing system to voice-enable their respective devices. The skill interfaces may be configured to generate directives which are hardware-specific and device-specific based on intents for voice commands. In this way, users are able to intuitively and easily interact with third-party developer devices using voice commands. As described above, some third-party device developers may had previously been required to maintain their own cloud-based infrastructure to support the generation of directives and commands for their third-party devices. Using this technique, a user would have to recite a name associated with the third-party developer in order to instruct the remote speech-processing system to contact the third-party cloud-based infrastructure. As an example, a user may have been required to state "Please have Ford turn on my windshield wipers", where the user previously provided the remote speech-processing system with account and/or log in information for their Ford account. Using these techniques, the remote speech-processing system would understand to reach out to the third-party cloud-based infrastructure for Ford and indicate an intent of the voice command of the user to turn on their windshield wipers, and receive a directive from the Ford cloud-based infrastructure. However, linking various third-party device accounts to an account of the speech-processing system is cumbersome, and the amount of time spent integrating and communicating between the remote speech-processing system and the third-party cloud-based infrastructure is costly in terms of resources (e.g., bandwidth, memory, software, processing power, etc.) and degrades user experience. The techniques described herein provide a more intuitive experience in that a user need only state "please turn on my windshield wipers" rather than having to name the vendors of the third-party devices to invoke their use. Thus, the techniques described herein provide implicit device targeting in that device-specific intents (e.g., turn on windshield wipers, turn on steering wheel warmer, etc.) are mapped to device-specific interfaces and directives using the device capabilities/skills.

For ease in describing the techniques of this application, much of the examples in the description is with respect to vehicles being the third-party devices. However, the techniques described herein are applicable to any third-party device that has functionality which could be voice-enabled, such as wearable devices (e.g., navigation devices, watches, glasses, etc.), appliances (e.g., dishwashers, coffee machines, etc.), HVAC devices (heaters, air conditioners, etc.), or any other type of device.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram of an illustrative environment 100 in which a third-party device developer may have created a skill interface for unique capabilities of a third-party device, and a user may control the third-party device using voice commands.

As shown, a client-side environment 102 may include a user 104, a voice-enabled device 106, and a third-party device 108. As shown in this example, the third-party device 108 may comprise a vehicle computing device, or comprise various devices internal to the vehicle computing device. For example, a central vehicle computing device (e.g., vehicle head unit) may control drivers for third-party devices internal the vehicle, such as windshield wipers, seat warmers, sunroofs, and so forth.

In various examples, the voice-enabled device 106 may enable the user 104 to control devices, such as third-party devices 108, in the client-side environment 102 based on a voice command 110 received from the user 104. In various examples, the client-side environment 102 may be an interior of the vehicle associated with the third-party device 108, or may be an environment outside the vehicle. For instance, the user 104 may be in a house and issue a voice command 110 to "please turn on my car", which results in the third-party device 108 of the vehicle engine to turn on. In the example described with reference to FIG. 1, the user 104 may be in an interior of the vehicle issue a voice command 110 to "please turn on my windshield wipers". However, other types of voice commands 110 may be used to control various third-party devices 108, such as "close my garage door", "mute my television", "turn on my stereo", or the like.

Generally, the voice-enabled device 106 may be designed to operate from a fixed location, and in other embodiments, the voice-enabled device 106 may be portable or mobile. For instance, the voice-enabled device 106 may comprise a handheld device or other mobile device, such as a smartphone, tablet computer, media player, personal computer, wearable device, various types of accessories, and so forth. As shown in FIG. 1, the user 104 would like to control a third-party device 108 comprising windshield wipers by issuing a voice command 110 to the voice-controlled device 106. Accordingly, the user 104 speaks a natural language voice command 110, such as "Please turn on my windshield wipers". The sound waves corresponding to the voice command 110 may be captured by one or more microphones of the voice-controlled device 106. In some implementations, the voice-controlled device 106 may process the captured signal. In other implementations, some or all of the processing of the sound may be performed by additional computing devices (e.g. servers) connected to the voice-controlled device 106 over one or more networks. For instance, in some cases the voice-controlled device 106 is configured to identify a predefined "wake word" (i.e., a predefined utterance). Upon identifying the wake word, the device 106 may begin uploading an audio signal generated by the device to remote servers for performing speech recognition thereon, as described in further detail below.

Upon detecting the voice command 110, the voice-enabled device 106 may generate audio data representing the voice command 110 using one or more microphones, and transmit the audio data over one or more networks 112 to a remote system 116. The networks 112 may represent an array or wired networks, wireless networks (e.g., WiFi), or combinations thereof. The remote system 114 may generally refer to a network-accessible system—or "cloud-based system"—implemented as a computing infrastructure of processors, storage, software, data access, and so forth that is maintained and accessible via the network 112, such as the Internet. Cloud-based systems may not require end-user knowledge of the physical location and configuration of the system that delivers services. Common expressions associated with cloud-based systems, such as the remote systems 114, include "on-demand computing", "software as a service (SaaS)", "system computing", "network accessible system", and so forth.

As illustrated, the remote system 114 may be implemented as one or more computing devices including one or more servers, desktop computers, laptop computers, or the like. In one example, the remote system 114 is configured in a server cluster, server farm, data center, mainframe, cloud computing environment, or a combination thereof. To illustrate, the remote system 114 may include any number of devices that operate as a distributed computing resource (e.g., cloud computing, hosted computing, etc.) that provides services, such as storage, computing, networking, and so on. Thus, the remote system 114 is generally implemented as network-accessible resources 116. These resources 116 comprise one or more processors 118 and computer-readable storage media 120 executable on the processors 118. The computer-readable media 120 may store various components, such as a skill-interface creation component 122, an event-directive component 124, and a command processor 126. The skill-interface creation component 122 may be accessible by various third-party device developers to facilitate voice-enablement of various third-party developer devices 108. The skill-interface creation component 122 may perform various operations for receiving input from a third-party device developer, and creating skill interfaces 128 which generally consist of one or more events 130 and one or more directives 132 which correspond to a specific capability of the third-party device 108.

In various examples, the components and functionality of the remote system 114 may be partially, or entirely, located in the client-side environment 102. For instance, the remote system 114 may be stored, partially or entirely, in the voice-enabled device 106. In some examples, one or more additional computing devices may be in the client-side environment 102 which include the components and data of the remote system 114. Thus, in various examples some or all of the remote system 114 may be positioned in the client-side environment 102.

Generally, the skill interfaces 128 may include different types of skill interfaces 128, such as third-party skill interfaces 128 and first-party skill interfaces 128. Examples of first-party skill interfaces 128 generally include interfaces which correspond to first-party devices which are developed and/or manufactured by the owner or operator of the remote system 114. For instance, various capabilities of the voice-enabled device 106 may correspond to individual first-party skill interfaces 128, such as a music streaming capability, a phone call capability, timers and alarms capabilities, and so forth. Conversely, third-party skill interfaces 128 generally correspond to device capabilities of third-party devices 108 developed and/or manufactured by third-party device developers, such as third-party devices 108 including windshield wipers, seat warmers, sunroofs, and other devices internal to the illustrated vehicle. For example, a skill interface 128 may be created for windshield wipers, and a different skill interface 128 may be created for seat warmers.

The skill-interface creation component 122 may provide an avenue, e.g., portal, through which third-party device developers may design their device-specific skill interfaces 128 whereby device events 130 and responsive directives 132 or instructions may be implemented for unique device capabilities of the third-party devices 108. In some examples, the skill-interface creation component 122 may expose or provide one or more user interfaces, such as via a website, that provide controls and other user interfaces to facilitate the creation of a skill interface 128 to voice-enable third-party devices 108 having unique device capabilities. The skill-interface component skill-interface creation component 122 may include various stages through which a third-party device developer creates their skill interfaces 128. For example, the skill-interface creation component 122 may initially request the third-party developer for unique skill-interface name and a description of its use. Pursuant to the example described herein, a third-party automobile device developer may create a skill interface 128 named "windshield wipers" to enable voice control for the specific windshield wipers used in automobiles they manufacture. In some examples, the name of the skill interface may be hardware and/or vendor specific (e.g., "Ford windshield wipers", "BMW windshield wipers", etc.), while in other examples, the names may be generic to the device type. Upon receiving a name for the skill interface 128 which indicates the device capability that is to be voice enabled, the third-party developer may further create one or more interface authorizations 134 regarding what types of devices 136, vendors 138, and so forth, the skill interface 128 is to support. For instance, the skill interface 128 named "windshield wipers" may have an authorization which limits the types of devices 136 that interact with the skill interface 128 to only windshield wipers, and/or limits which vendors/parties 138 are able to interact with the skill interface 128 (e.g., only Ford associated vehicle devices).

Once the third-party developer has utilized the skill-interface creation component 122 to create the skill interface 128 with an appropriate name and device authorizations 134, the third-party developer may proceed to create or add the various events 130 and related directives 132 via the skill-interface creation component 122. The directives 132 defined and input by the third-party device developer into the skill interface 128 may be specific to the corresponding third-party device 108, such as commands or instructions specific to hardware of the third-party device 108. For instance, the directives 132 may be written such that the third-party devices 108 that receive the directives 132 are able to process the directives 132, and perform commands responsive to the directives 132. As an example, a directive 132 for the "windshield wiper" device 108 interface may be written such that the windshield wiper, or the vehicle computing device of the vehicle including the windshield wipers, can process the directive 132 and cause the device driver for a motor of the windshield wipers to turn on or off. The directives 132 may generally be written in any machine-readable code or format, such as JavaScript Object Notation (JSON), that is capable of being processed by the corresponding third-party device 108 and/or configures the corresponding third-party device 108 to perform an operation based on the directive 132. The directive 132, or directives, may further include fields which are readable by the third-party device 108 to control various aspects of the third-party device 108. In the example of the windshield wiper, the directive may include fields to indicate a setting for the speed at which the windshield wipers are to move, a duration for which the windshield wipers are to turn on, and so forth. Thus, the skill-interface creation component 122 may enable the third-party developer to create skill interfaces 128 which include hardware, and/or device-specific, directives 132 for controlling the third-party devices 108 according to their unique capabilities.

In various examples, the skill-interface creation component 122 may further receive input from the third-party developers to further define the events 130 which trigger corresponding directives 132 to be generated and sent to the devices 108. The events 130 may correspond to voice commands 110, e.g., speech utterances, of the user 104 which indicate that the intent of the user 104 is to have the third-party device 108 perform an action or operation specified in the voice command 110. In some examples, the skill-interface creation component 122 may receive, via the developer portal, various predefined voice commands 110 that result in particular directives 132 being generated and ultimately sent to the third-party device 108. For instance, depending on the configuration of the remote system 114, voice commands 110 received at the remote system 114 may be processed to determine an intent of the voice command 110. As an example, the third-party developer may provide input indicating that a voice command 110 of "please turn on my windshield wipers", and another voice command of "start my windshield wipers", may each be processed using natural language understanding techniques such that each voice command 110 or utterance is mapped to, e.g., associated with, the same intent, which would be to have a driver for the windshield wipers turn on and move the windshield wipers. Thus, an example of an event 130 that may trigger a corresponding directive 132 would be a voice command 110 mapping to an intent that is in turn mapped to a directive 132 in the skill interface 128 created for the third-party device 108. Accordingly, the third-party developer may define or provide different voice commands 110 or utterances which are mapped to intents that in turn correspond to a directive 132. In this way, intents determined for voice commands 110 may be events 130 that trigger the generation and transmission of a directive 132 for a third-party device 108.

Accordingly, the remote system 114 may include an orchestration component 140 to facilitate voice-processing techniques for the voice commands 110. For instance, the orchestration component 140 may interact with a speech processing component 142 which includes an automatic speech-recognition (ASR) component 144 and a natural-language-understanding (NLU) component 146 for processing the audio data representing the voice commands 110. The orchestration component 140 may call or communicate with the ASR component 144, and the NLU component 146 for processing the audio data representing the voice command 110. For example, the orchestration component 140 may stream the audio data to the ASR component 144, which detects an endpoint of the voice-command 110 and sends a message to the voice-enabled device 106 to close the stream of the audio data. In some instances, the ASR component 144 of the speech-processing component 142 may process the audio data to determine textual data which corresponds to the voice command 110. In some examples, the ASR component 144 may generate ASR confidence scores representing the likelihood that a particular set of words of the textual data matches those spoken in the voice command 110. For instance, the ASR component 144 may determine a confidence or likelihood that a particular word which matches the sounds would be included in the sentence at the specified location (e.g., using a language or grammar model). Thus, each potential textual interpretation of the voice command 110 (hypothesis) is associated with an ASR confidence score. The ASR component 144 may then return the textual data to the orchestration component 140.

In various examples, the textual data corresponding to the voice command 110 may be sent from the orchestration component 140 to the NLU component 146 to be analyzed or processed by the NLU component 146 to determine an intent expressed by the user 104 in the voice command 110. For example, if the user 104 issued a command to "please turn on my windshield wipers," the NLU component 146 may determine that the user's intent is to have the voice-enabled device 106 send a directive 132 to the third-party device 108 to turn on windshield wipers of the vehicle.

Once the intent has been determined by the NLU component 146, the orchestration component 140 may pass the intent to an event-directive component 124. The event-directive component 124 may include instructions for determining, based on the intent, which directive 132 to generate and send to the voice-enabled device 106. In some examples, the intent determine may generally correspond to a type of event 130. For instance, an intent for "please turn on my windshield wipers" may be mapped to, e.g., otherwise associated with, an event 130 which in turn maps to a directive 132 which is generated and configured to cause a specific windshield wiper to turn on according to various parameters.

In some examples, other types of events 130 may occur which trigger the generation and transmission of a directive 132. For instance, the third-party devices 108 may include sensors that generate sensor data indicating that an event has occurred that may trigger a directive 132. As an example, a third-party device 108 such as the described windshield wipers may have moisture sensors that collect moisture data indicating that the windshield of the vehicle has moisture on it. If the vehicle computing device determines that the moisture sensor data indicates moisture, or moisture over a certain threshold moisture measurement, the vehicle computing device (or another device in an environment of the vehicle computing device) may transmit an indication to the remote speech-processing system of an event occurring. The third-party developer may specify in the skill interface 128 that a moisture event 130 maps to a directive 132 in the "windshield wiper" skill interface 128 to cause a directive 132 for turning on the windshield wipers to be generated and transmitted. In various examples, the moisture event 130 may be mapped to the speech-processing component 142 to facilitate a dialogue with the user. For instance, the moisture event may initially trigger a response by the speech-processing component 142 including an audio file that asks the user 104 "We detected moisture on the windshield", to which the user 104 can answer "yes" to trigger the appropriate directive, or alternatively answer "No, I am just in a vehicle wash" which may map to an intent that does not trigger the directive 132 to turn on the windshield wipers. Accordingly, various types of events may trigger a directive, such as sensor data for the third-party devices 132.

In some examples, the event-directive component 124 may further work in conjunction with a command processor 126 to generate the directive 132. The command processor

126 may include one or more domain speechlets which determine, based on the intent, and generate a directive 132 for the third-party device 108 to execute or perform. In some examples, the command processor 126 may route identified intents to the appropriate speechlets. For example, the speechlets may be specialized software, domains, and/or devices for responding based on various intents, such as a music domain (e.g., Amazon Music, Pandora, Spotify, etc.), a video domain (e.g., Amazon Video, HBO, Netflix, Hulu, etc.) household organization domain (e.g., calendars, reminders, timers, alarms, etc.), an automotive domain, and other types of domains. For example, an intent may include a command to turn on the windshield wipers (turn on windshield wipers intent), the command processor 126 may route the intent to an automotive domain speechlet configured to execute a windshield wiper command. Once the command processor 126 has generated the directive 132, the command processor 126 may provide the directive 132 in a response to the voice-enabled device 106 to send to the third-party device 108 to turn on the windshield wipers.

In some examples, the voice-enabled device 106 may receive the directive 132 over the networks 112. The voice-enabled device 106 may be configured with software, and/or logic, to determine which device in the client-side environment 102 to send the directive 132. For instance, there may be multiple third-party devices 108, and or first-party devices, in the client-side environment that the voice-enabled device 106 is able to communicate with. In such examples, the voice-enabled computing device 106 may determine, based on the directive or other data sent from the remote system 114, to which device to send the directive 132. For instance, if the directive is associated with a windshield wiper skill or capability, then the voice-enabled device 106 may determine to send the directive 132 to the third-party device 108 that corresponds to or is otherwise associated with the windshield wiper (e.g., vehicle computing device). The voice-enabled device 106 may be configured to communicate with the third-party device 108 using various wireless protocols, such as Bluetooth, WiFi, ZigBee, and so forth. Upon receiving the directive 132, the third-party device 108 may perform the operation that is instructed by the third-party device 108. The directive 132 may be in a format that is readable or otherwise executable by the third-party device, such as JSON.

In other examples, the third-party device 108 may be configured to send and receive data over the networks 112 as well. In such examples, the third-party device 108 may receive the directive 132 from the remote system 114 directly over the network 112. In even further examples, all or some of the functionality of the voice-enabled device 106 may be included in the third-party device 108. For instance, the speech processing abilities, microphones, etc., may be internal to the third-party device, as explained with reference to FIG. 2. In this way, the remote system may voice-enable the third-party device 108.

Generally, the voice-enabled device 106 may comprise any type of computing device (e.g., telephone device, tablet device, laptop computing device, mobile device, etc.) configured to send and receive data. In some examples, the voice-enabled device 106 may be configured to send and receive data over various types of networks, such as the short-range networks as well as long-range networks. For instance, the voice-enabled device 106 may be configured to send and receive data over wireless wide area networks (WWANs), such as 3G networks, 4G networks, 4G LTE networks, and so forth. While illustrated as being a WAN network 112, the network 112 may alternatively be any other type of network configured to send and receive data between computing devices, such as Personal Area Networks (PANs), Local Area Networks (LANs), Campus Area Networks (CANs), Metropolitan Area Networks (MANs), Broadband Global Area Networks (BGANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

FIG. 2 illustrates a block diagram of an example architecture of a voice-enabled device (e.g., voice-enabled device 106) which detects voice commands (e.g., voice commands 110), generates audio data representing the voice commands, and transmits the audio data to a remote speech-processing system (e.g., remote system 114). The voice-enabled device 106 may further receive directives 132 responsive to the voice commands 110 for controlling a third-party device 108. In some examples, the user device 108 may comprise a fixed device (or stationary device) at a location in a client-side environment 102, or a mobile device carried with the user 104. In some examples, the voice-enabled device 106 may also be associated with, or a part of, a third-party device 108. For instance, various software and/or hardware components may be implemented as part of the third-party device 108.

The voice-enabled device 106 includes one or more processors 200, one or more speakers 202, and one or more microphones 204. The processors 200 may include a central processing unit (CPU), a graphics processing unit (GPU), a microprocessor, a digital signal processor, and so on. Although not illustrated, the voice-enabled device 106 may also include one or more input/output devices (e.g., mouse, keyboard, etc.), one or more displays (e.g., touch screen, Liquid-crystal Display (LCD), Light-emitting Diode (LED) display, organic LED display, plasma display, electronic paper display, etc.), one or more sensors (e.g., accelerometer, magnetometer, etc.), one or more lights, and so on. Any number of components of the voice-enabled device 106 may be used to receive input from a user and/or to output a response.

Although the voice-enabled device 106 is illustrated as having one or more integral speakers 202, in other embodiments the voice-enabled device 106 may not include speakers 202. For example, the voice-enabled device 106 may comprise a microphone device into which a user speaks to issue commands or may comprise a device for connection to another appliance such as a television. Instead of integrated speakers 202, embodiments such as this may use loudspeaker capabilities of other devices (e.g., third-party devices 108), including other voice-enabled devices that do have loudspeakers and different types of dedicated loudspeaker components. As one example, the voice-enabled device 106 may produce an audio output signal that drives an external loudspeaker. As another example, the voice-enabled device 106 may drive or control an external loudspeaker through a wireless data connection such as a Bluetooth connection. In other situations, the voice-enabled device 106 may be used in conjunction with a loudspeaker device that receives audio signals and other instructions from the remote system 114, rather than from the voice-enabled device 106.

The microphones 204 may include sensors (e.g., transducers) configured to receive sound. The microphones 204 may generate input signals for audio input (e.g., sound). For example, the microphones 204 may determine digital input signals for an utterance of a user. In some instances, the microphones 204 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 270) to receive sound from four directions. The microphones 204 may be in a planar configuration, or positioned apart in a non-planar three-dimensional region. In some implementations, the microphones 204 may include a spatially disparate array of sensors in data communication. For example, a networked array of sensors may be included. The microphones 204 may include omni-directional microphones, directional microphones (e.g., shotgun microphones), and so on.

In some examples, the microphones 204 and the speakers 202 facilitate interactions, such as dialogue, with user 104. The microphones 204 produce audio signals representing sound from the environment of the voice-enabled device 106, such voice commands 110 by the user 104. The audio signals produced by the microphones 204 may comprise directional audio signals or may be used to produce directional audio signals, where each of the directional audio signals emphasizes audio from a different radial direction relative to the microphones 204.

The voice-enabled device 106 may include computer-readable media 206. The computer-readable media 206 may be used to store any number of software components that are executable by the processors 200. Software components stored in the computer-readable media 210 may include an operating system 208 that is configured to manage hardware and services within and coupled to the voice-enabled device 106.

In some examples, the computer-readable media 206 may store an acoustic front end (AFE) 210 for performing various pre-processing techniques on acoustic signals (e.g., voice command 110) captured by one or more microphones 204 of the voice-enabled device 106.

The AFE 210 may include an acoustic echo cancellation or suppression component for reducing acoustic echo generated by acoustic coupling between the microphones 204 and one or more speakers 202 of the voice-enabled device 106, or speakers of other devices in the vehicle environment (e.g., third-party device 108). The AFE 210 may also include a noise reduction component for reducing noise in received audio signals, such as elements of microphone audio signals other than user speech. The AFE 210 may include one or more audio beamformers or beamforming components configured to generate directional audio signals that are focused in different directions. More specifically, the beamforming components may be responsive to audio signals from spatially separated microphone elements of the microphones 204 to produce directional audio signals that emphasize sounds originating from different areas of the environment of the voice-enabled device 106 or from different directions relative to the voice-enabled device 106.

The computer-readable media 206 may further include a wake word detection component 212 to detect a wakeword by performing wakeword detection on the audio data within which voice activity has been detected or on a directional audio signal within which the highest level of voice activity has been detected. As mentioned above, a predefined word, expression, or other sound can be used as a signal that the user 104 intends subsequent speech to be received and acted upon by the voice-enabled device 106. In some examples, the wakeword detection may be implemented using keyword spotting technology. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In some cases, a keyword spotter may use simplified ASR (automatic speech recognition) techniques. For example, the wake word detection component 212 may use a Hidden Markov Model (HMM) recognizer that performs acoustic modeling of an audio signals and compares the HMM model to one or more reference HMM models that have been created by training for a specific trigger expression. An HMM model represents a word as a series of states. Generally, a portion of an audio signal is analyzed by comparing its HMM model to an HMM model of the trigger expression, yielding a feature score that represents the similarity of the audio signal model to the trigger expression model. In practice, an HMM recognizer may produce multiple feature scores, corresponding to different features of the HMM models.

The wakeword detection may also use a support vector machine (SVM) classifier that receives the one or more feature scores produced by the HMM recognizer. The SVM classifier produces a confidence score indicating the likelihood that an audio signal contains the trigger expression. As described above, the voice-enabled device 106 may begin storing and/or streaming audio data upon detecting a predefined wake word.

The voice-enabled device 106 may further include a directive-routing component 214 configured to determine which device in the client-side environment 102 to send a directive 132 to. For instance, there may be multiple third-party devices 108, and or first-party devices, in the client-side environment that the voice-enabled device 106 is able to communicate with. In such examples, the directive-routing component 214 of the voice-enabled computing device 106 may determine, based on the directive 132 or other data sent from the remote system 114, to which device to send the directive 132. For instance, if the directive 132 is associated with a windshield wiper skill or capability, then the voice-enabled device 106 may determine to send the directive 132 to the third-party device 108 that corresponds to or is otherwise associated with the windshield wiper (e.g., vehicle computing device).

The voice-enabled device 106 may have one or more network interfaces 216 such as a wireless or Wi-Fi network communications interface, an Ethernet communications interface, a cellular network communications interface, a Bluetooth communications interface, etc., for communications with the third-party device 108 and the remote system 114 over various types of networks, including local-area networks, private networks, public networks, wide-area networks, or any other type of network. In the case of a wireless communications interfaces, such interfaces may include radio transceivers and associated control circuits and logic for implementing appropriate communication protocols. The network interfaces 216 may utilize one or more antennas of the voice-enabled device 106 to send and receive signals over various networks.

Figure 3:
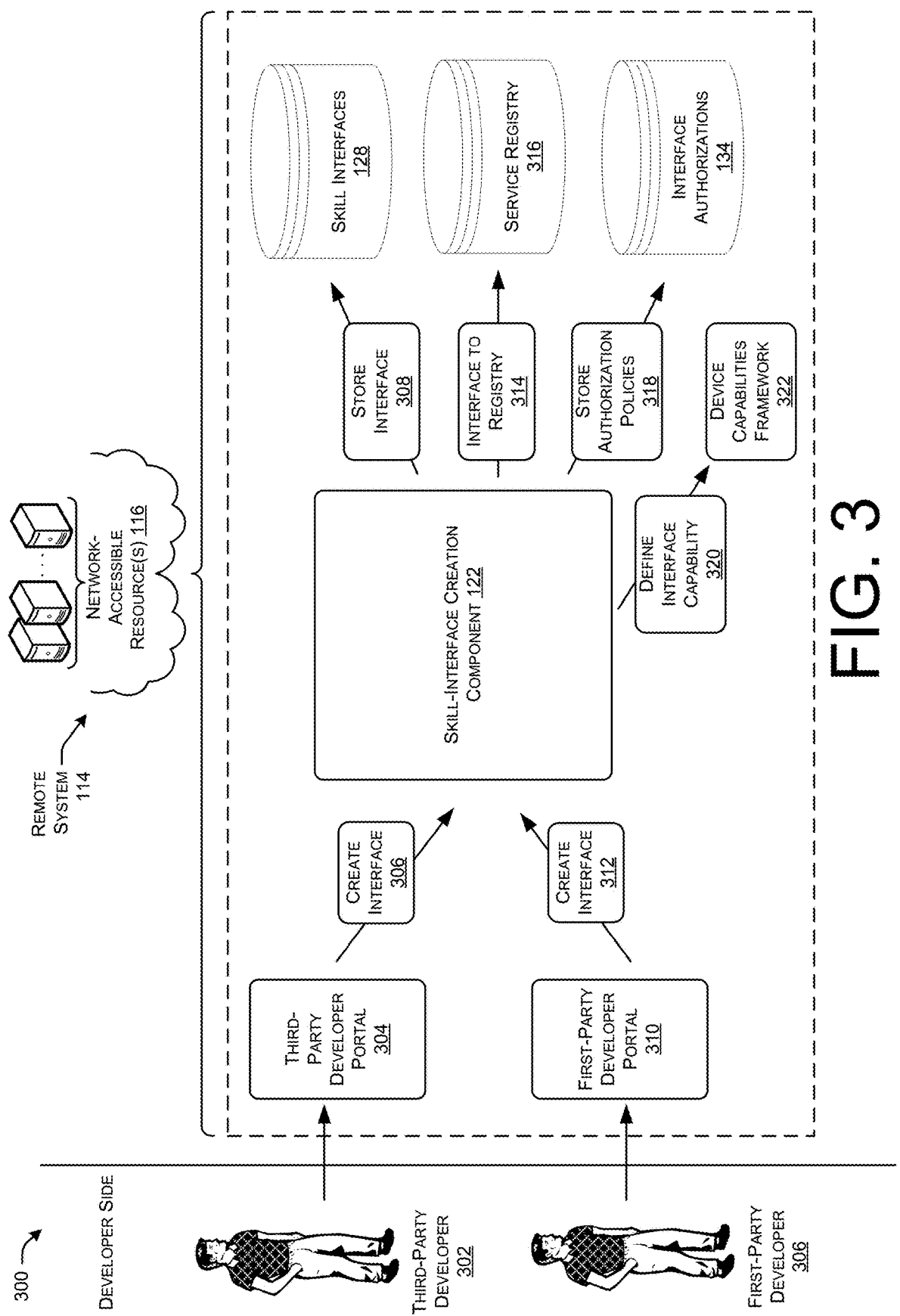
FIG. 3 illustrates an example signal flow diagram in an environment in which a third-party device developer may create a skill interface at a remote speech-processing system to facilitate voice control over unique capabilities of third-party devices.

FIG. 3 illustrates an example signal flow diagram in an environment 300 in which a third-party device developer may create a skill interface 128 at a remote speech-processing system (e.g., remote system 114) to facilitate voice control over unique capabilities of third-party devices 108.

In various examples, the skill-interface creation component 122 may perform some, or all, of the operations described with reference to FIG. 3. As illustrated, the skill-interface creation component 122 may be accessible by various third-party device developers 302 to facilitate voice-enablement of various third-party developer devices 108. For instance, the skill-interface creation component 122 may host, expose, or otherwise provide a third-party developer portal 304 through which the third-party developer 302 may provide input to create a skill interface at 306. In some examples, the skill-interface creation component 122 may host, expose, or provide the third-party developer portal 304 by hosting or creating a website, or other network-based location, that the third-party developer 302 may access and/or log into in order to create a skill interface at 306. In some examples, the third-party device developer 302 may navigate to a user interface in the portal 304 for creating a custom skill interface 128. The third-party device developer 302 may click a "create interface" button and provide a unique skill interface name (e.g., "windshield wipers") and a description of its use. In some examples, the name may be specific to the third-party device developer's 302 devices or naming conventions, while in other examples the name may be global/generic to other third-party device developers 302. Once the skill interface 128 is created, the third-party device developer 302 may create/add events 130 and directives 132 using the third-party developer portal 304. The may further provide unique names for respective event/directives within the skill interface 128 space and define the JSON files payload that is included in the directives. In some examples, the remote system 114 may approve the skill interface 128 created at 306, and if approved, the skill-interface creation component 122 may store the skill interface 128 at 308 in the skill interface 128 storage. Similarly, a first party-developer who owns, operates, or is otherwise associated with the remote system 116 may perform similar techniques using a first-party developer portal 310 to create an interface at 312. The interfaces may be stored in the skill interface 128 storage.

As described herein, a third-party developer 302 may be identified based on a third-party developer profile that is registered with the remote system 114. Similarly, the first-party developer 306 may be identified based on a first-party developer profile associated with or registered with the remote system 114.

Generally, the skill-interface creation component 122 may expose programmable Application Programming Interfaces (APIs) that can be used by the third-party developer portal 304 and/or the first-party developer portal 310 to create, read, and update skill interfaces 128. The skill-interface creation component 122 may authenticate requests, throttle excess traffic and validate input based on pre-defined business rules (e.g., maximum length of a string datatype, disallow free-form JSON, etc.).

The skill-interface creation component 122 may further store the skill interface 128 at 314 to a service registry 316. In some examples, the skill-interface creation component 122 may store various metadata in the service registry 316 regarding how to invoke the skill interface 128 that was created and how to call the skill interface 128. For instance, the metadata may indicate what speechlets invoke the skill interface 128, what voice commands 110 invoke the skill interface 128, what sensor data invokes the skill interface 128, and so forth.

The skill-interface creation component 122 may store various authorization policies at 318 to the interface authorizations 144. For instance, the interface authorizations 144 may store indications of what types of devices, vendors, and so forth, the skill interface 128 is to support. For instance, the skill interface 128 named "windshield wipers" may have an authorization which limits the types of devices that interact with the skill interface 128 to only windshield wipers, and/or limits which vendors/parties are able to interact with the skill interface (e.g., only Ford associated vehicle devices).

The skill-interface creation component 122 may define the interface capability at 320 and store an indication of the skill interface capability in a device capabilities framework 322. The device capabilities framework 322 may publish the skill interface 128 for other components of the remote system 114 to access. The techniques of FIG. 3 are one illustrative example of how a third-party developer 302 may create a skill interface 128 at the remote system 114 to facilitate voice control over unique capabilities of third-party devices. However, other techniques may also be used.

Figure 4:
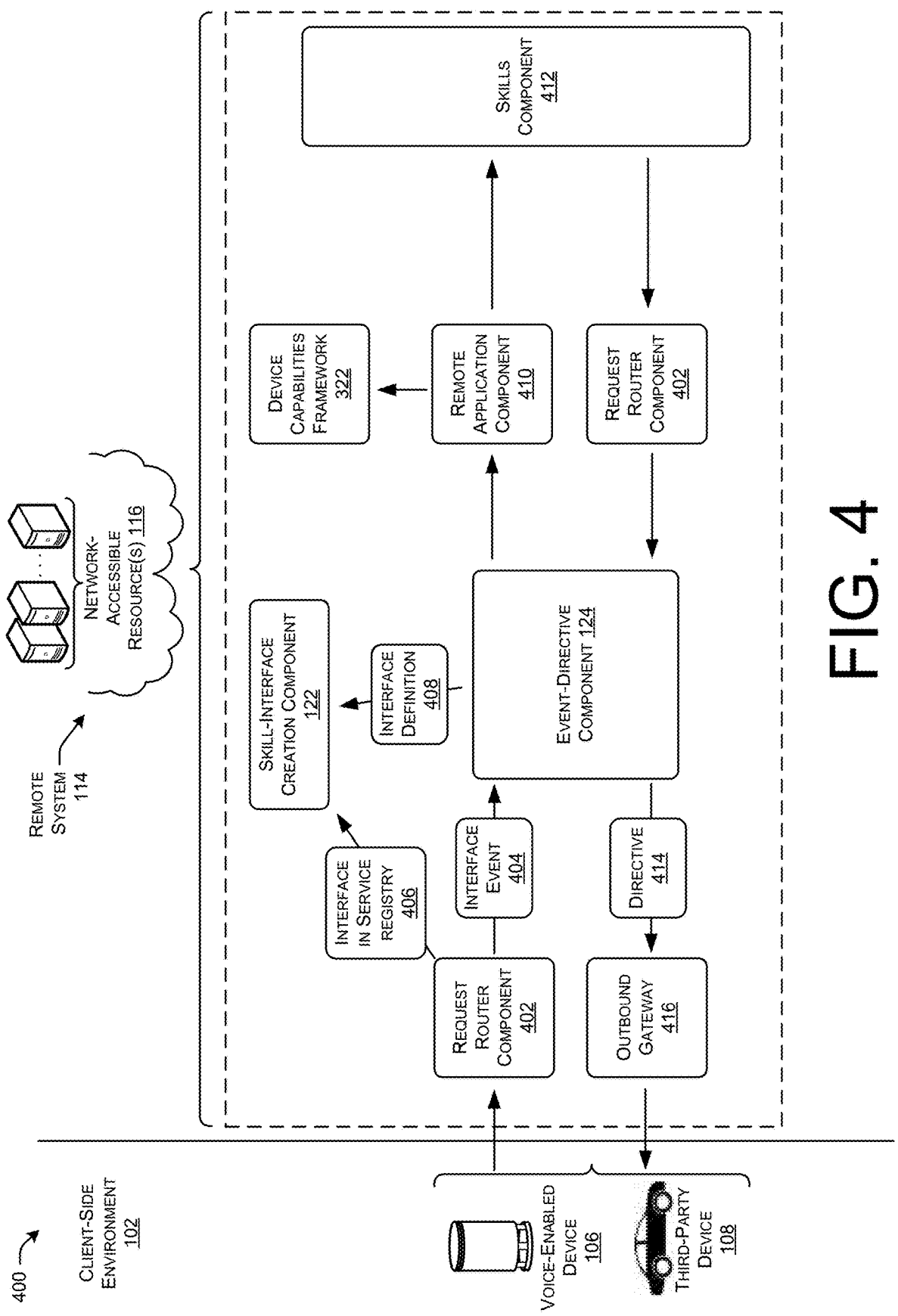
FIG. 4 illustrates an example signal flow diagram in an environment in which a third-party device performs an operation corresponding to a directive generated by a skill interface of a remote speech-processing system based on an event occurring with the third-party device, such as a voice command.

FIG. 4 illustrates an example signal flow diagram in an environment 400 in which a third-party device 108 performs an operation corresponding to a directive 132 generated by a skill interface 128 of a remote speech-processing system (e.g., remote system 114) based on an event 130 occurring with the third-party device 108, such as a voice command 110.

As shown in FIG. 4, the voice-enabled device 106 and/or the third-party device 108 may send various data to a request router component 402 of the remote system 114. The data may be an interface event 404 which is then passed on to the event-directive component 124. In some examples, the interface event 404 may include audio data representing a voice command 110 of a user for the third-party device 108 to perform an action or operation. In other examples, the interface event 404 may comprise an indication that sensors on the third-party device 108 detected an event which requires a directive (e.g., moisture on a windshield, a vehicle approaching quickly which requires braking, etc.). in various examples, the event-directive component 124 may use the orchestration component 140 in combination with the speech-processing component 142 to determine an intent of the voice command, which corresponds to the interface event 404. In some examples, prior to sending the interface event 404 to the event-directive component 124, the inbound gateway may determine, at 406, whether the interface event is in the service registry by querying the skill-interface creation component. Additionally, the request router component 402 determines which skill interface 128 to use for the interface event. The interface event sent at 404 may comprise some sort of JSON payload defined by the third-party device developer.

Upon receiving the interface event 404 from the request router component 402, the event-directive component 124 may validate that the device 106 and/or 108 is authorized to send the event 404. Further, the event-directive component 124 may obtain the interface definition at 408 from the skill-interface creation component 122 that corresponds to the interface event 128 and may determine that the interface definition 408 is well-formed. Further, the event-directive component 124 may obtain authorization policies for the skill interface definition and determine whether the third-party device 108 is authorized to interact with the skill interface 128 determined for the event. The event-directive component 124 may call the remote application component 410 to call the device capabilities framework 322 to determine the device capabilities and/or skills and further to dispatch the interface event to a skills component 412.

The skills component 412 may determine, based on the interface event and using the skill interface definition, which directive to generate that is responsive to the event. The skills component 412 may generate the appropriate directive, which may comprise a packed JSON file. In some examples, the JSON file may be device specific and/or hardware specific for the third-party device 108. The packed JSON file may be passed through the request router component 402 through the event-directive component 124. In some examples, the event-directive component 124 may call a validation service or component to validate the directive. For instance, the validation service may determine whether the directive is appropriate for the third-party device 108. In the example of windshield wipers, the validator may ensure that the speed of the windshield wipers indicated in the directive is appropriate, and other parameters of the directive are appropriate. If the directive is validated, the request router component 402 sends the directive at 414 to an outbound gateway 416, which in turn sends the directive to the third-party device 108 or the voice-enabled device 106 for sending to the third-party device 108.

Figure 5:
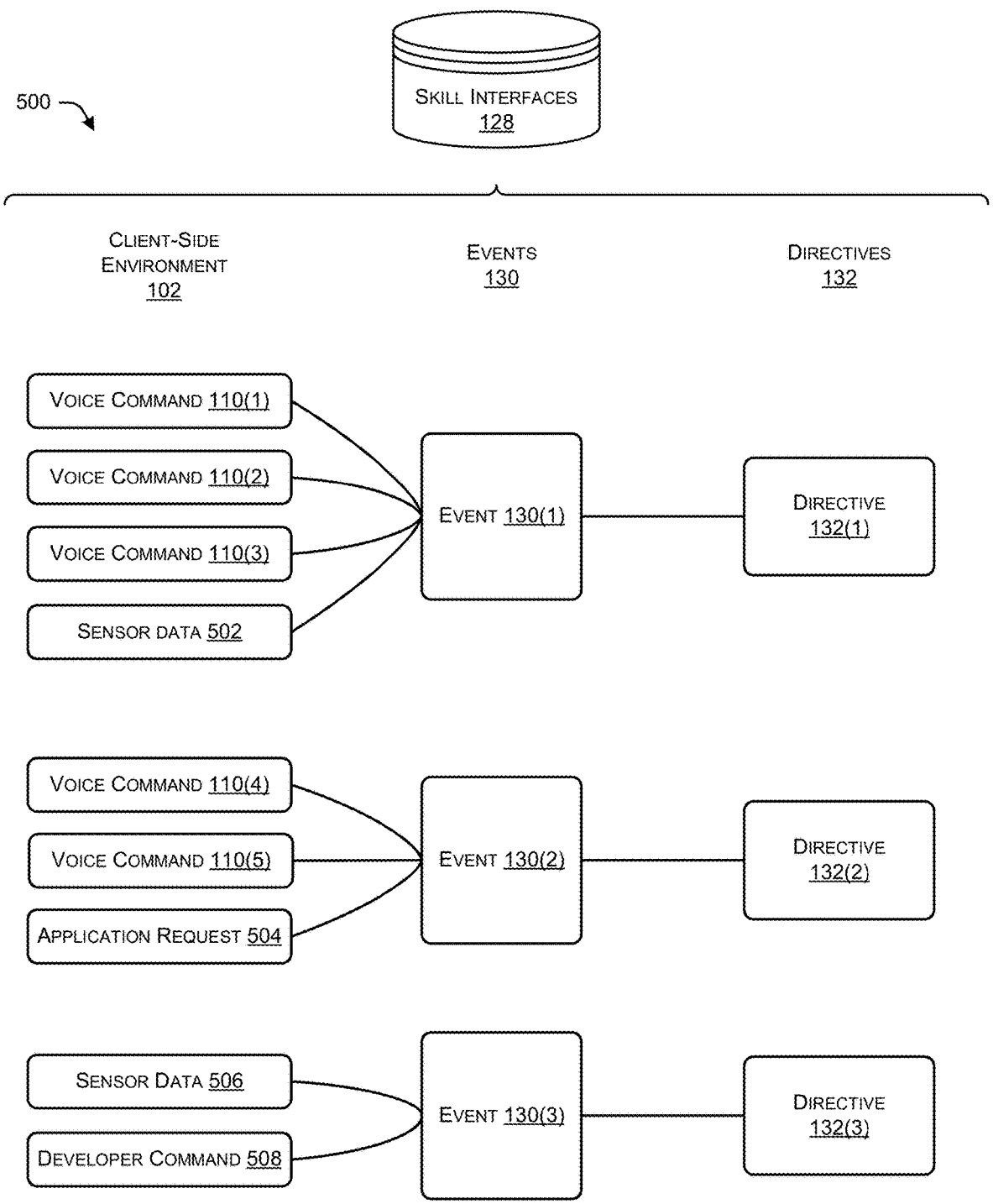
FIG. 5 illustrates an example mapping stored between voice commands, events, and directives. When a third-party developer creates a new skill interface, the third-party developer may further map the voice commands and other event types to the appropriate events, and map the events to the appropriate directives.

FIG. 5 illustrates an example mapping 500 stored between voice commands 110, events 130, and directives 132. When a third-party developer 302 creates a new skill interface 128, the third-party developer 302 may further map the voice commands 110 to the appropriate events 130, and map the events 130 to the appropriate directives 132. In various examples, the third-party developer 302 may create the mapping 500 using the third-party developer portal 304 exposed or provided by the skill-interface creation component 122.

To illustrate, FIG. 5 is shown to include three events 130(1), 130(2), and 130(3). These events may represent client-side environment 102 events that occurred. For instance, the events 130 may correspond to voice commands 110 or intents or voice command 110, sensor data 502 collected by the third-party device 108, application request events 504 based on input received via a user application, and/or developer commands 508 received from computing devices (e.g., network-based devices) associated with a third-party developer 302. When the third-party developer 302 creates a skill interface 128, the third-party developer 302 may indicate voice commands 110 that map to intents/events 130. For instance, event 130(1) may comprise an intent of "turn on windshield wipers", and voice command 110(1) may be "please turn on my windshield wipers", voice command 110(2) may be "please start my windshield wipers", and voice command 110(3) may be "use my windshield wipers". When these voice commands 110(1), 110(2), and 110(3) are processed and their intents are determined to correspond to the event 130(1), the event 130(1) may in turn be mapped to the directive 132(1) which may comprise a file, such as a JSON file, configured to cause the windshield wipers to turn on. For instance, the skill interface 128 may map the event 130(1) to the directive 132(1), which may comprise a JSON file to send to the third-party windshield wipers.

In various examples, different types of client-side environment 102 data may be mapped to the same event 130 as a voice command 110. As illustrated, the sensor data 502 event where the third-party device 108 includes sensors to detect sensor data 502 which may also be mapped to trigger the event 130(1). For example, moisture sensors of a third-party device 108 may collect sensor data 502 which indicates that moisture is on the windshield, which maps to the event 130(1) that is in turn mapped to the directive 132(1) which is generated to cause the windshield wipers to turn on. Thus, various types of data may be mapped to the same event 130.

As another example, the skill interfaces 128 may further include additional directives 132(2) based on different capabilities of the third-party device 108. For example, the vehicle associated with the third-party developer 302 may include the capability and directive 132(1) for turning on windshield wipers, and also a capability and directive 132(2) for turning on an ignition of the car. In such an example, voice command 110(4) may be "start my car" and voice command 110(5) may be "turn on my car", where both voice commands 110(4) and 110(5) map to the same event 130(2). In some examples, the third-party developer 302 may indicate that both the voice commands 110(4) and 110(5) have the same intent corresponding to event 130(2). The event 130(2) may then be mapped to the directive 132(2). Directive 132(2) may comprise an instruction that causes the third-party device 108 ignition to start the vehicle. Further, an application request 504 may also be mapped to the event 130(2) to cause the directive 132(2) to be generated to turn on the car. For example, an application may be installed on a user device of the user that is associated with, or provided by, the third-party developer 302. The user may provide input into the application on their user device to turn on their vehicle remotely, and the application request 504, which may be routed through one or more network-based devices associated with the third-party developer 302, may be in turn mapped to the event 130(2) indicating that the vehicle is to be turned on, and the event 130(2) may in turn be mapped to the directive 132(2) configured to cause the ignition of the vehicle to turn the vehicle on. In this way, an application request 504 may further be mapped to an event 130(2), and in turn a directive 132(2).

As another example, the skill interfaces 128 may further include mappings between additional types of data based on different capabilities of the third-party device 108, such as sensor data 506 and developer commands 508, and an event 130(3), which is in turn mapped to a directive 132(3). For example, the vehicle associated with the third-party developer 302 may include the capability and directive 132(3) for turning on a "check-oil" indicator/light in the vehicle, and/or for scheduling an oil change for the user of the vehicle. in such an example, sensor data 506 may be collected by a sensor internal to the third-party vehicle 108 which indicates that the oil is low, and/or dirty, and needs to be replaced. An indication of this sensor data 506 may be mapped to the event 130(3) for changing oil, which is in turn mapped to the directive 132(3) which may cause the change-oil indicator to light up in the vehicle 108 and/or schedule an oil change for the user in a calendar of the user. In some examples, a developer command 508 may also be mapped to the same event 130(3) as the sensor data 506. For example, third-party developers 302 may push developer commands 508 to the remote system 114, where the developer commands 508 are mapped to events 130. In this example, the third-party developer 302 may determine, e.g., estimate, times that the user of the third-party device 108 is to change their oil based on driving habits. Thus, the third-party-developers 302 may push the developer command 508 from a third-party developer device to the remote system 114, which is mapped to the event 130(3), which is in turn mapped to the directive 132(3) for turning on a "check-oil" indicator/light in the vehicle 108, and/or for scheduling an oil change for the user of the vehicle 108.

Although not illustrated, the mapping 500 may similarly be created for any type of third-party device 108 with unique capabilities.

Figure 6A:
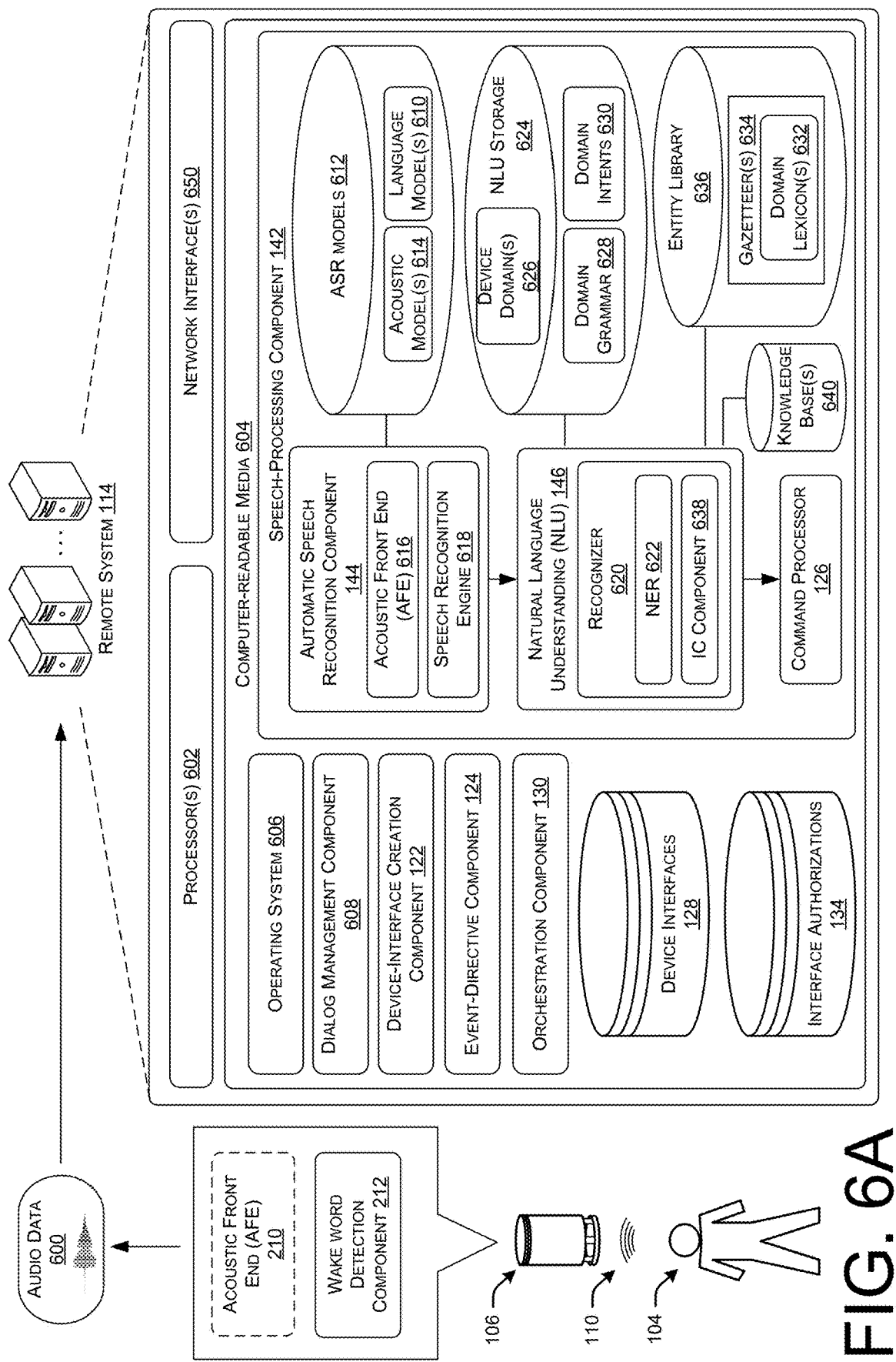
FIG. 6A illustrates a block diagram of an example architecture of a speech-processing system which receives audio data from a voice-enabled device, and performs speech automatic speech recognition (ASR) and/or natural language understanding (NLU) techniques to determine an intent of the voice command.

FIG. 6A illustrates a block diagram of an example architecture of a speech-processing system (e.g., remote system 114) which receives audio data 600 from a voice-enabled device 106, and performs speech automatic speech recognition (ASR) and/or natural language understanding (NLU) techniques to determine an intent of the voice command 110.

FIG. 6A includes a conceptual diagram of how a voice command 110 can be processed, allowing a system to capture and execute commands spoken by a user 104, such as spoken commands that may follow a wakeword. The various components illustrated may be located on a same or different physical devices. Communication between various components illustrated in FIG. 6A may occur directly or across a network. An audio capture component, such as a microphone 204 of voice-enabled device 106, captures audio corresponding to a voice command 110. The voice-enabled device 106, using a wakeword detection component 212, then processes the voice command 110, e.g., audio data corresponding to the voice command 110, to determine if a keyword (such as a wakeword) is detected in the voice command 110. Following detection of a wakeword, the voice-enabled device 106 sends audio data 600 corresponding to the voice command 110, to a computing device of the remote system 114 that includes an ASR component. The audio data 600 may be output from an acoustic front end (AFE) 210 located on the voice-enabled device 106 prior to transmission. Or, the audio data 600 may be in a different form for processing by a remote AFE 616, such as the AFE 616 located with the ASR component 144.

In various examples, the remote system 114 may include one or more processors 600 to power components, devices, and actions of the remote system 114, and one or more network interfaces 650 such as a wireless or Wi-Fi network communications interface, an Ethernet communications interface, a cellular network communications interface, a Bluetooth communications interface, etc., for communications by the remote system 114 over various types of networks, including wide-area network, local-area networks, private networks, public networks etc. In the case of a wireless communications interfaces, such interfaces may include radio transceivers and associated control circuits and logic for implementing appropriate communication protocols.

The remote system 114 may further include computer-readable media 604 which stores various components, components, or other executable software to perform various arbitration actions to determine which voice-enabled device is to respond to a command in the voice command 110. The computer-readable media may store an operating system 606 that is configured to manage hardware and services within and coupled to the remote system 114.

The computer-readable media 602 may further store a dialog management component 608 that is responsible for conducting speech dialogs with the user 104 in response to meanings or intents of user speech determined by the NLU component 146. The dialog management component 608 may include domain logic that is used to analyze the meaning of user speech and to determine how to respond to the user speech. The dialog management component 608 may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user voice commands. In some examples, the dialog component 608 may perform dialogs with the user 104 to determine an intent, and thus an event, that corresponds to a directive.

The computer-readable media 602 may further include the skill interfaces 128 including the events 130 and the directives 132 to voice-enable third-party devices 108, as well as the interface authorizations 134 including the devices 136 and the vendors 134 who are authorized to use the devices interfaces 128. The remote system 114 may further include various components for processing a voice command 110, such as automatic speech recognition component 144 and natural language understanding component 146. The various components illustrated may be located on a same or different physical devices.

In some examples, audio data 600 may be received by the remote system 114 for speech processing for interpretation of the included voice command 110 (either for purposes of enabling voice-communications and/or for purposes of executing a command in the speech). The audio data 600 may include data corresponding to the wake word, or the portion of the audio data corresponding to the wake word may be removed by the voice-enabled device 106 prior to sending. Upon receipt by the remote system 114, the ASR component 144 may convert the audio data into text. The ASR component 144 transcribes audio data 600 into text data representing the words of the voice command 110 contained in the audio data 600. The text data may then be used by other components for various purposes, such as executing system commands, inputting data, determining audio data, etc. A voice command 110 in the audio data 600 is input to a processor configured to perform ASR which then interprets the utterance based on the similarity between the utterance and pre-established ASR language models stored in an ASR model knowledge base (ASR Models Storage 612). For example, the ASR process may compare the input audio data with models for sounds (e.g., subword units or phonemes) and sequences of sounds to identify words that match the sequence of sounds spoken in the utterance of the audio data.

The different ways a voice command 110 may be interpreted (i.e., the different hypotheses) may each be assigned an ASR probability or an ASR confidence score representing the likelihood that a particular set of words matches those spoken in the voice command 110. The ASR confidence score may be based on a number of factors including, for example, the similarity of the sound in the utterance to models for language sounds (e.g., an acoustic model 614 stored in an ASR Models Storage 612), and the likelihood that a particular word which matches the sounds would be included in the sentence at the specific location (e.g., using a language or grammar model). Thus, each potential textual interpretation of the spoken utterance (hypothesis) is associated with an ASR confidence score. Based on the considered factors and the assigned ASR confidence score, the ASR component 144 outputs the most likely text recognized in the audio data. The ASR component 144 may also output multiple ASR hypotheses in the form of a lattice or an N-best list with each hypothesis corresponding to an ASR confidence score or other score (such as probability scores, etc.).

The device or devices performing the ASR processing may include an acoustic front end (AFE) 616 and a speech recognition engine 618. The acoustic front end (AFE) 616 transforms the audio data from the microphone into data for processing by the speech recognition engine 618. The speech recognition engine 618 compares the speech recognition data with acoustic models 614, language models 610, and other data models and information for recognizing the speech conveyed in the audio data. The AFE 616 may reduce noise in the audio data and divide the digitized audio data into frames representing time intervals for which the AFE 616 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 616 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 618 may process the output from the AFE 616 with reference to information stored in speech/model storage (612). Alternatively, post front-end processed data (such as feature vectors) may be received by the device executing ASR processing from another source besides the internal AFE 616. For example, the voice-enabled device 106 may process audio data into feature vectors (for example using an on-device AFE 210) and transmit that information to a server across a network for ASR processing. Feature vectors may arrive at the remote system 114 encoded, in which case they may be decoded prior to processing by the processor executing the speech recognition engine 618.

The speech recognition engine 618 attempts to match received feature vectors to language phonemes and words as known in the stored acoustic models 614 and language models 610. The speech recognition engine 618 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 618 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 618 to other processing components, which may be local to the device performing ASR and/or distributed across the network(s). For example, ASR results in the form of a single textual representation of the speech, an N-best list including multiple hypotheses and respective scores, lattice, etc., may be sent to the remote system 114, for natural language understanding (NLU) processing, such as conversion of the text into commands for execution, either by the user device, by the remote system 114, or by another device (such as a server running a specific application like a search engine, etc.).

The NLU component 146 (e.g., server) may include various components, including potentially dedicated processor(s), memory, storage, etc. As shown in FIG. 6A, the NLU component 146 may include a recognizer 620 that includes a named entity recognition (NER) component 622 which is used to identify portions of query text that correspond to a named entity that may be recognizable by the system. A downstream process called named entity resolution links a text portion to a specific entity known to the system. To perform named entity resolution, the system may utilize gazetteer information 634 stored in entity library storage 636. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as automotive), or may be organized in a variety of other ways.

Generally, the NLU component 146 takes textual input (such as the textual input determined by the ASR component 144) and attempts to make a semantic interpretation of the text. That is, the NLU component 146 determines the meaning behind the text based on the individual words and then implements that meaning. NLU component 146 interprets a text string to derive an intent or a desired action from the user as well as the pertinent pieces of information in the text that allow a device (e.g., voice-enabled device 106, third-party device 108, etc.) to complete that action. For example, if a voice command 110 is processed using ASR component 144 and outputs the text "turn on windshield wipers" the NLU component 146 may determine that the user 104 intended that the third-party device 108 be instructed to turn on windshield wipers. As another example, if the voice command 110 is processed using ASR component 144 and outputs the text "turn off my windshield wipers" the NLU component 146 may determine that the user 104 intended that the third-party device 108 comprising windshield wipers be instructed to turn off.

The NLU component 146 may process several textual inputs related to the same voice command. For example, if the ASR component 144 outputs N text segments (as part of an N-best list), the NLU component 146 may process all N outputs to obtain NLU results.

To correctly perform NLU processing of speech input, the NLU component 146 may be configured to determine a "domain" of the voice command so as to determine and narrow down which services offered by the endpoint device (e.g., remote system 114 or the voice-enabled device 106) may be relevant. For example, an endpoint device (e.g., voice-enabled device 106, third-party device 108, etc.) may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 622 receives a query in the form of ASR results and attempts to identify relevant grammars and lexical information that may be used to construe meaning. To do so, the NLU component 146 may begin by identifying potential domains that may relate to the received query. The NLU storage 624 includes a database of devices domains 626 which identify domains associated with specific devices. For example, the voice-enabled device 106 may be associated with domains for music, telephony, calendaring, contact lists, and device-specific communications, but not video. In addition, the device domains 626 may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 620, language model and/or grammar databases 628, a particular set of domain intents/actions 630, and a particular personalized domain lexicon 632. Each gazetteer 634 may include domain-indexed lexical information associated with a particular user and/or device. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) component 638 parses the query to determine an intent or intents for each identified domain, where the intent corresponds to the action to be performed that is responsive to the query. Each domain is associated with a database (e.g., domain intents 630) of words linked to intents. For example, a music domain intent database 630 may link words and phrases such as "quiet," "volume off," and "mute" to a "mute" intent. A voice-message domain intent database, meanwhile, may link words and phrases such as "send a message," "send a voice message," "send the following," or the like. The IC component 638 identifies potential intents for each identified domain by comparing words in the query to the words and phrases in the domain intents database 630. In some instances, the determination of an intent by the IC component 638 is performed using a set of rules or templates that are processed against the incoming text to identify a matching intent.

In order to generate a particular interpreted response, the NER 622 applies the grammar models and lexical information associated with the respective domain to actually recognize a mention one or more entities in the text of the query. In this manner, the NER component 622 identifies "slots" (i.e., particular words in query text) that may be needed for later command processing. Depending on the complexity of the NER component 622, it may also label each slot with a type of varying levels of specificity (such as noun, place, city, artist name, song name, or the like). Each grammar model 628 includes the names of entities (i.e., nouns) commonly found in speech about the particular domain (i.e., generic terms), whereas the lexical information 632 from the gazetteer 634 is personalized to the user(s) and/or the device. For instance, a grammar model associated with the shopping domain may include a database of words commonly used when people discuss shopping.

The intents identified by the IC component 638 are linked to domain-specific grammar frameworks (included in 630) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "turn on" is an identified intent, a grammar (628) framework or frameworks may correspond to sentence structures such as "Turn on {device}," "Start my {device}," "Please initiate {device}," etc.

For example, the NER component 622 may parse the query to identify words as subject, object, verb, preposition, etc., based on grammar rules and/or models, prior to recognizing named entities. The identified verb may be used by the IC component 638 to identify intent, which is then used by the NER component 622 to identify frameworks. A framework for the intent of "turn on," meanwhile, may specify a list of slots/fields applicable to play the identified "device" and any object modifier (e.g., specifying a device of the recipient) or the like. The NER component 622 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 622 may search the database of generic words associated with the domain (in the knowledge base 640). So, for instance, if the query was "send message to Joe," after failing to determine a last name for "Joe," the NER component 622 may search the domain vocabulary for the word "Joe." In the alternative, generic words may be checked before the gazetteer information, or both may be tried, potentially producing two different results.

The output data from the NLU component 146 (which may include tagged text, commands, etc.) may then be sent to the command processor 126. The destination command processor 126 may be determined based on the NLU output. For example, if the NLU output includes a command to send a message, the destination command processor 126 may be a message sending application, such as one located on the user device or in a message sending appliance, configured to execute a message sending command. If the NLU output includes a search request, the destination command processor 126 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 146 during runtime operations where NLU operations are performed on text (such as text output from an ASR component 144). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 620. Each recognizer may include various NLU components such as an NER component 622, IC component 638 and other components such as an entity resolver, or other components.

As noted above, multiple devices may be employed in a single remote system 114. In such a multi-device system, each of the devices may include different components for performing different aspects of the speech processing. The multiple devices may include overlapping components. The components of the voice-enabled device 106 and the remote system 114, as illustrated herein are exemplary, and may be located in a stand-alone device or may be included, in whole or in part, as a component of a larger device or system, may be distributed across a network or multiple devices connected by a network, etc.

Figure 6B:
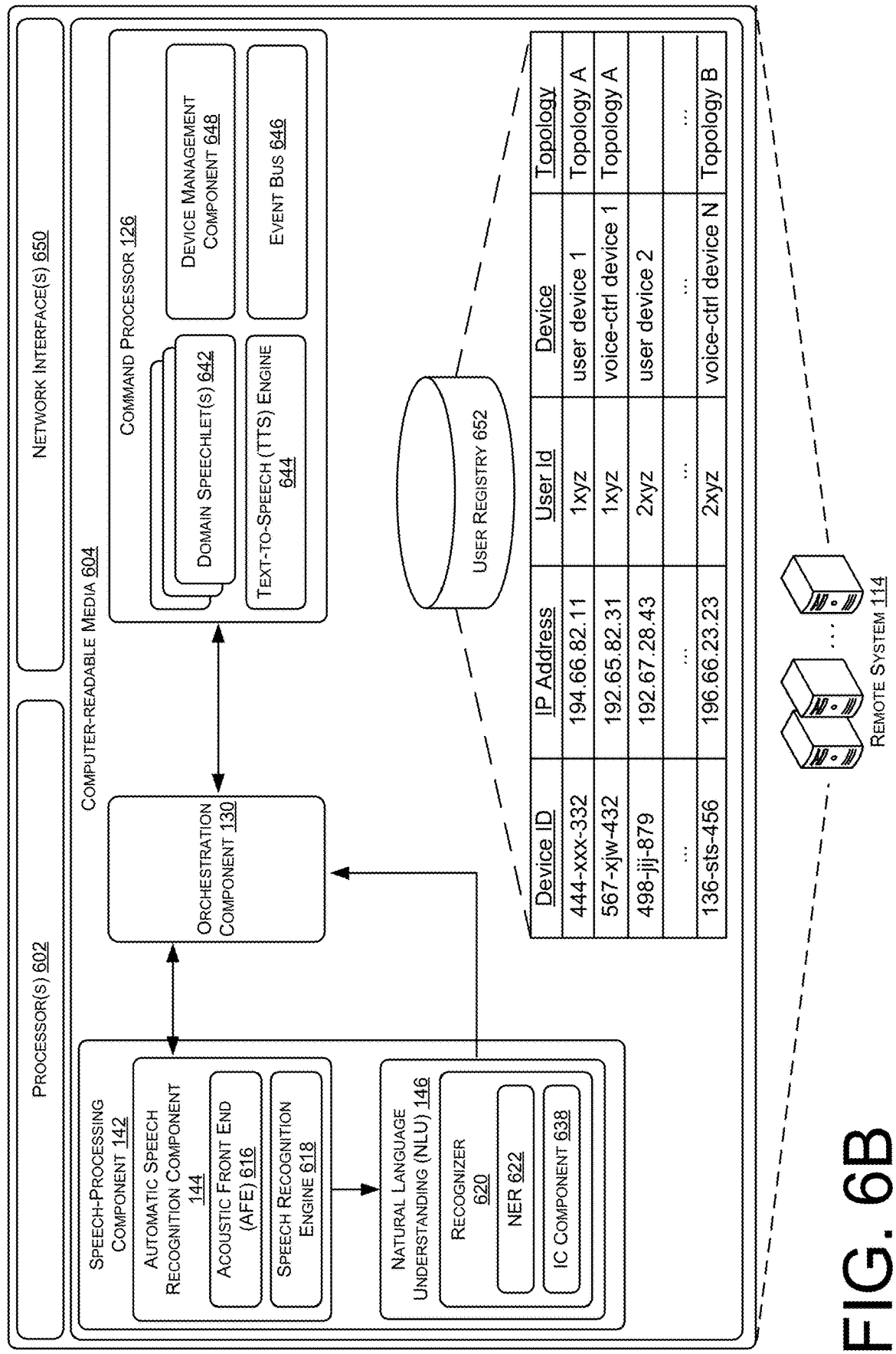
FIG. 6B illustrates a block diagram of an example architecture of a speech processing system including a command processor configured to generate a directive and/or additional content that is responsive to an intent of the voice command.

FIG. 6B illustrates a block diagram of an example architecture of a speech processing system (e.g., remote system 114) including a command processor 126 configured to generate a directive and/or additional content that is responsive to an intent of the voice command. As illustrated in FIG. 6B, the remote system 114, including the orchestration component 140 and a speech processing component 128 comprising the ASR component 144 and the NLU component 146, may be coupled to the command processor 126.

The command processor 126 and/or NLU component 146 may determine a domain based on the intent and, based on this determination, route the request corresponding to the audio data to the appropriate domain speechlet, such as the illustrated domain speechlets 642. The domain speechlet 642 may comprise any type of device or group of devices (e.g., hardware device, virtual devices or partitions, server, etc.), and may receive the text data and/or an intent associated with the audio data 600 and determines how to respond to the request. For instance, the intent for a command "please start my windshield wipers" may be routed to an automotive domain speechlet 642 which controls devices connected to the voice-enabled device 106, such as a third-party device 108 including windshield wipers. The automotive domain speechlet 642 may determine a command to generate based on the intent of the user 104 to start the windshield wipers. Additionally, the automotive domain speechlet 642 may determine additional content, such as TTS response audio data, to be output by the vehicle computing device and/or the voice-enabled device 106, such as "we have started your windshield wipers."

Various types of domain speechlets 642 may be used to determine how the devices 106 and/or 108 are to respond to the voice command 110, as well as the appropriate response and potential additional content (e.g., TTS response audio data, earcon audio data, etc.). For example, the domain speechlets 642 may include a third party skills domain speechlet 642 which may handle intents associated with gaming, productivity, etc., a music domain speechlet 642 which may handle intents associated with music play requests (e.g., Amazon Music, Pandora, Spotify, iHeart, etc.), a video domain speechlet 642 which may handle intents associated with video play requests (e.g., Amazon Video, HBO, Netflix, Hulu, etc.), a household organization domain speechlet 642 which may handle intents associated with household activities (e.g., calendars, reminders, timers, etc.), a smart device domain speechlet 642 which may handle intents associated with controlling smart devices (e.g., controlling lights, door locks, vehicle monitoring, etc.), an automotive domain speechlet 642, a shopping domain speechlet 642 which may handle shopping requests (e.g., making a shopping list, ordering items online, etc.), and/or a weather domain speechlet 642 which may handle requests for weather forecasts (e.g., providing a URL to a weather website, providing weather related images and/or videos, etc.). As described herein, new speechlets 642 may be created to handle new skill interfaces 128 created by third-party developers.

After the domain speechlet 642 generates the appropriate command based on the intent of the user 104, and/or provides additional content, such as audio data, to be output by one of the voice-enabled device 106 or the third-party device 108 (e.g., "we have started your windshield wipers"), the domain speechlet 642 may provide this information back to the command processor 126, which in turns provides some or all of this information to a text-to-speech (TTS) engine 644. The TTS engine 644 then generates an actual audio file for outputting the second audio data determined by the domain speechlet 642 (e.g., "we have started your windshield wipers", or "we have opened your sunroof . . . "). After generating the file (or "TTS response audio data"), the TTS engine 644 may provide this data back to the remote system 114.

The remote system 114 may then publish (i.e., write) some or all of this information to an event bus 646. That is, the remote system 114 may provide information regarding the initial request (e.g., the speech, the text, the domain/intent, etc.), the response to be provided to the voice-enabled device 106, user device 108, and/or vehicle computing device 110 (e.g., the command to start windshield wipers, the command to start seat warmers, etc.), or any other information pertinent to the interaction between the third-party device 108 and the remote system 114 to the event bus 646.

Within the remote system 114, one or more components or services may subscribe to the event bus 646 so as to receive information regarding interactions between user devices and the remote system 114. In the illustrated example, for instance, the device management component 648 may subscribe to the event bus 646 and, thus, may monitor information regarding these interactions. In some examples, monitoring information in the event bus 646 may comprise communications between various components of the remote system 114. In some examples, the event bus 746 may "push" or send indications of events and/or device state data to the different components. Additionally, or alternatively, the event bus 646 may be "pulled" where the command processor 126 sends requests to the event bus 646.

The device management component 648 functions to monitor information published to the event bus 646 and identify events that may trigger action. For instance, the device management component 648 may identify (e.g., via filtering) those events that result in an action to be taken, such as streaming music audio data or performing a call. The device management component 48 may determine whether a particular event identified is associated with supplemental content. That is, the device management component 7648 may write, to a datastore, indications of which types of events and/or which primary content or responses are associated with supplemental content (e.g., TTS response audio data, earcon audio data, etc.). In some instances, the remote system 114 may provide access to third-party developers to allow the developers to register supplemental content for output on secondary devices for particular events and/or primary content. For example, if a device 106 and/or 108 is to output that the weather will include thunder and lightning, the device management component 648 may store an indication of supplemental content such as thunder sounds, pictures/animations of lightning and the like. In another example, if a device 106 and/or 108 is outputting information about a particular fact (e.g., "a blue whale is the largest mammal on earth . . . "), then a secondary device, such as display device, may be configured to provide supplemental content such as a video or picture of a blue whale. In these and other examples, the device management component 648 may store an association between the primary response or content (e.g., outputting of information regarding the world's largest mammal) and corresponding supplemental content (e.g., the audio data, image data, or the like). In some instances, the device management component 648 can also indicate which types of secondary devices are to output which supplemental content. For instance, in the instant example, the device management component 648 may store an indication that secondary devices of a class type "tablet" are to output a picture of a blue whale. In these and other instances, meanwhile, the device management component 648 may store the supplemental content in association with secondary-device capabilities (e.g., devices with speakers output the audio commentary, devices with screens output the image, etc.).

Finally, the device management component 648 may determine how to transmit response and/or supplement content (and/or information acquiring the content) to the third-party device 108 and/or the voice-enabled device 106. To make this determination, the device management component 648 may determine a device type of the devices 108 and/or 106, capabilities of the device(s), or the like, potentially as stored in the user registry 652. In some instances, the device management component 648 may determine that a particular device 108 is able to communicate directly with the remote system 114 (e.g., over WiFi) and, thus, the device management component 648 may provide the response and/or content directly over a network to the device 108.

The computer-readable media 602 may further include the user registry 652 that includes data regarding user profiles as described herein. The user registry 652 may be located part of, or proximate to, the remote system 114, or may otherwise be in communication with various components, for example over a network. The user registry 652 may include a variety of information related to individual users, accounts, etc. that interact with the voice-enabled devices 106, and the remote system 114. For illustration, the user registry 652 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device.

As used herein, a processor, such as processor(s) 118, 200, and/or 602, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 118, 200, and/or 602 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 118, 200, and/or 602 may possess its own local memory, which also may store program components, program data, and/or one or more operating systems.

As described herein, computer-readable media 120, 206, and/or 604 may include volatile and nonvolatile memory, removable and non-removable media implemented in any method or technology for storage of information, such as computer-readable instructions, data structures, program component, or other data. Such computer-readable media 120, 206, and/or 604 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 118, 200, and/or 602 to execute instructions stored on the computer-readable media 120, 206, and/or 604. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 120, 206, and/or 604, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Figure 7:
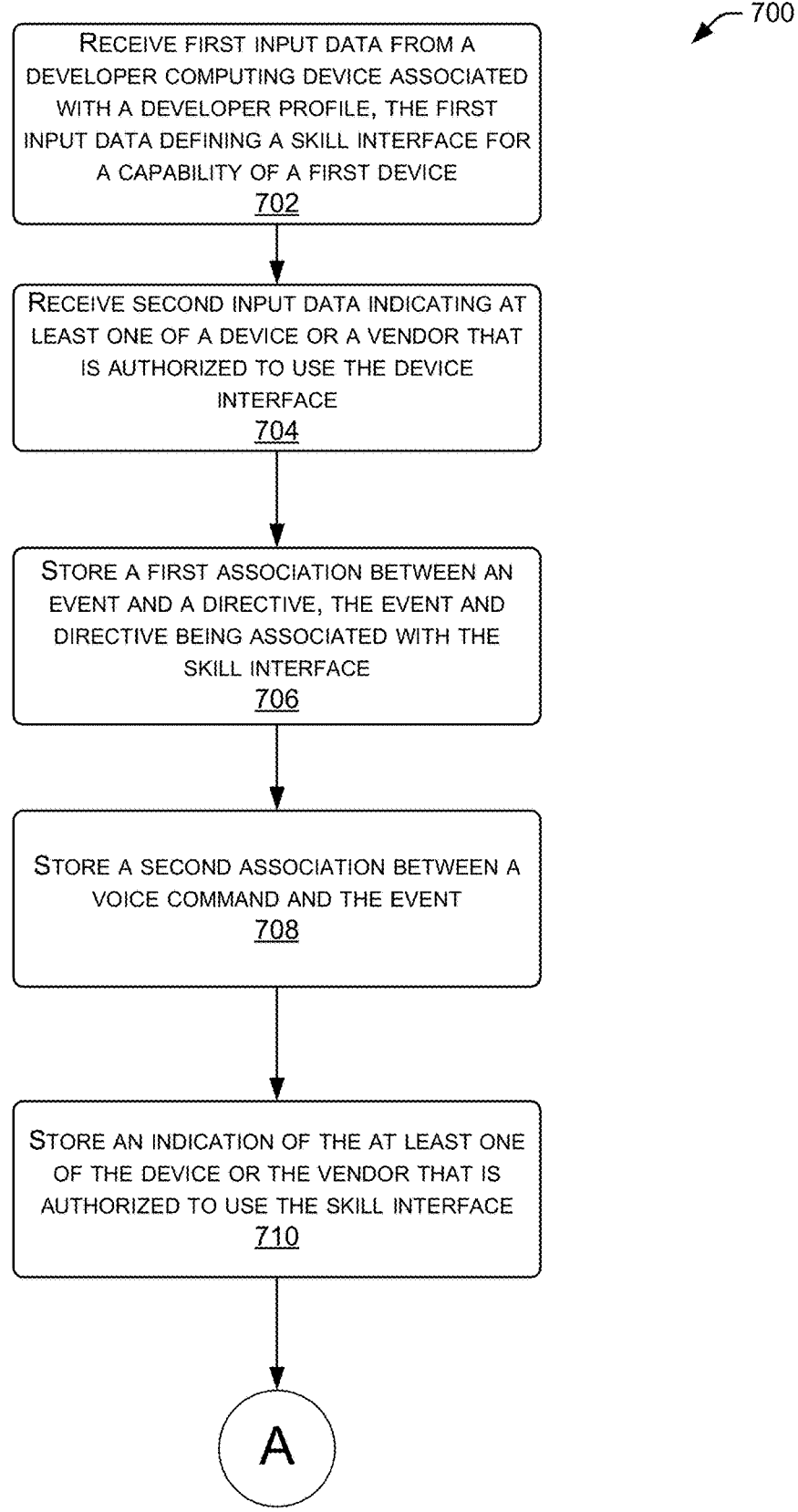
FIG. 7 illustrates a flow diagram of an example method for a third-party device developer to create a skill interface at a remote speech-processing system to facilitate voice control over unique capabilities of third-party devices.
Figure 8:
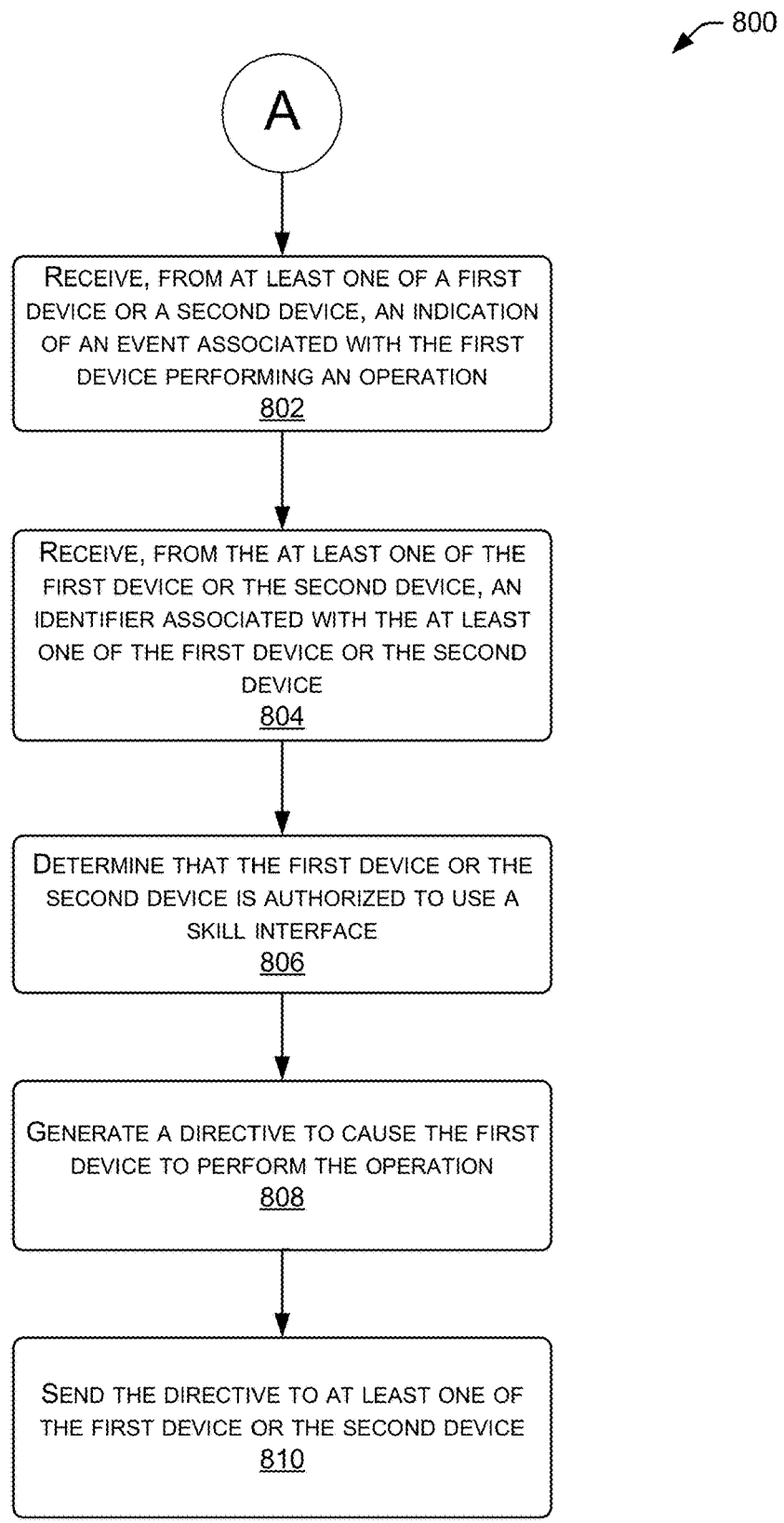
FIG. 8 illustrates a flow diagram of an example method for a third-party device to perform an operation corresponding to a directive generated by a skill interface of a remote speech-processing system based on an event occurring with the third-party device, such as a voice command.

FIGS. 7 and 8 illustrate flow diagrams of example methods to perform the techniques described herein. It should be understand the various steps or blocks shown in the methods may be omitted in some examples, and additional steps may be added. In some examples, multiple or all of the steps may be performed at least partially in parallel. The steps may be performed by various hardware, software, and/or firmware components described herein.

FIG. 7 illustrates a flow diagram of an example method 700 for a third-party device developer to create a skill interface at a remote speech-processing system to facilitate voice control over unique capabilities of third-party devices.

At 702, the remote system 114 may receive first input data from a developer computing device associated with a third-party developer profile. In some examples, the first input data may define a skill interface for a capability of a first device, such as a third-party device 108 associated with the third-party developer profile. In some examples, the first input data defining the skill interface may include (i) a device capability of a device associated with the third-party developer profile, (ii) a first indication of a directive configured to cause the device to perform an operation associated with the device capability, and (iii) a second indication of an event associated with the device performing the operation.

At 704, the remote system 114 may receive second input data indicating at least one of a device or a vendor that is authorized to use the skill interface. For instance, the second input data may indicate what types of devices, vendors, and so forth, the skill interface is to support. For instance, the skill interface named "windshield wipers" may have an authorization which limits the types of devices that interact with the skill interface to only windshield wipers, and/or limits which vendors/parties are able to interact with the skill interface (e.g., only Ford associated vehicle devices). The authorizations may be determined based on vendor IDs, device IDs, etc.

At 706, the remote system 114 may store a first association between an event and a directive. In various examples, the event and the directive may be associated with the skill interface, or defined as part of the skill interface. For instance, the remote system 114 may be used to create and store a mapping 500. As an example, a third-party developer profile may specify in the skill interface that a moisture event maps to a directive in the "windshield wiper" to cause a directive for turning on the windshield wipers to be generated and transmitted At 708, the remote system 114 may store a second association between a voice command and the event. In some examples, a third-party developer profile may provide input data indicating that a voice command of "please turn on my windshield wipers", and another voice command of "start my windshield wipers", may each be processed using natural language understanding techniques such that each voice command or utterance is mapped to, or associated with, the same intent, which would be to have a driver for the windshield wipers turn on and move the windshield wipers.

At 710, the remote system 114 may store an indication of the at least one of the device or the vendor that is authorized to use the skill interface. For instance, the skill interface named "windshield wipers" may have an authorization which limits the types of devices that interact with the skill interface to only windshield wipers, and/or limits which vendors/parties 138 are able to interact with the skill interface (e.g., only Ford associated vehicle devices).

FIG. 8 illustrates a flow diagram of an example method for a third-party device to perform an operation corresponding to a directive generated by a skill interface of a remote speech-processing system based on an event occurring with the third-party device, such as a voice command.

At 802, the remote system 114 may receive, from at least one of a first device or a second device, an indication of an event associated with the first device performing an operation. In some examples, the event may comprise a voice command which maps to an intent associated with or corresponding to the event. In various examples, the event may comprise sensor data associated with a third-party device that triggers a directive for the third-party device.

At 804, the remote system 114 may receive, from the at least one of the first device or the second device, an identifier associated with the at least one of the first device or the second device. The identifier may comprise a device identifier (e.g., IP address, device serial number, etc.), or a vendor/account number.

At 806, the remote system 114 may determine that the first device or the second device is authorized to use a skill interface. For instance, the device identifier may be determined to be included in a list of whitelisted, or accepted/permitted, device identifiers that are allowed or authorized to use the skill interface.

At 808, the remote system 114 may generate a directive to cause the first device to perform the operation. For example, the skill interface may define a mapping between the event and the directive, and the appropriate directive (e.g., JSON file) may be generated.

At 810, the remote system 114 may send the directive to at least one of the first device or the second device. depending on the capabilities of the devices, the directive may be sent to either the first device or the second device (e.g., the voice-enabled device 106 or the third-party device 108).

FIGS. 9A-9E illustrate example skill creation user interfaces developed by a remote speech-processing system through which a third-party developer may create a new skill interface, and specify directives, events, and authorizations for the skill interface. In some examples, the user interfaces shown in FIGS. 9A-9E may correspond to, or otherwise be associated with, the third-party developer portal 304 and/or the first-party developer portal 310 for receiving input from third-party developers 302 and/or first-party developers 306. The skill interface-creation component 122 may interact with the user interfaces of FIGS. 9A-9E to receive various input data via the user interfaces, as described in more detail below.

The user interfaces shown in FIGS. 9A-9E are merely illustrative means through which a developer 900 may provide information to create a skill interface 128. The number, arrangement, and configuration of the user interfaces may be modified in any way. For example, the user interfaces may be a single, scrollable user interface, or any number of user interfaces. Additionally, the layout and types of information on the user interfaces may be varied. Regardless of the number, layout, and information included in the user interfaces of FIGS. 9A-9E, the user interfaces may generally be configured to receive input from a developer 900 and from a developer device 902. As described herein, the developer 900 may correspond to a third-party developer 302, and/or a first-party developer 306. Similarly, the developer device 902 may be a third-party developer device associated with the third-party developer 302, or a first-party developer device associated with the first-party developer 306.

In some examples, an owner and/or operator of the remote system 114 may create or cause to be created, design, host, manufacture, or otherwise provide user interfaces through a means (e.g., portal such as a website) by which the developer 900 may develop skill interfaces 128 using one or more developer devices 902. For example, the developer 900 may access the user interfaces using their developer device 902 via a website, or another network-accessible location, text-input forms, and so forth, and provide input to create their skill interfaces 128 to enable capabilities/skills of their third-party devices 108. Thus, an owner/operator of the remote system 114 may receive input via the user interfaces of FIGS. 9A-9E and from a developer device 902 which defines a skill interface 128, such as a skill interface 128 for a third-party device 108.

Figure 9A:
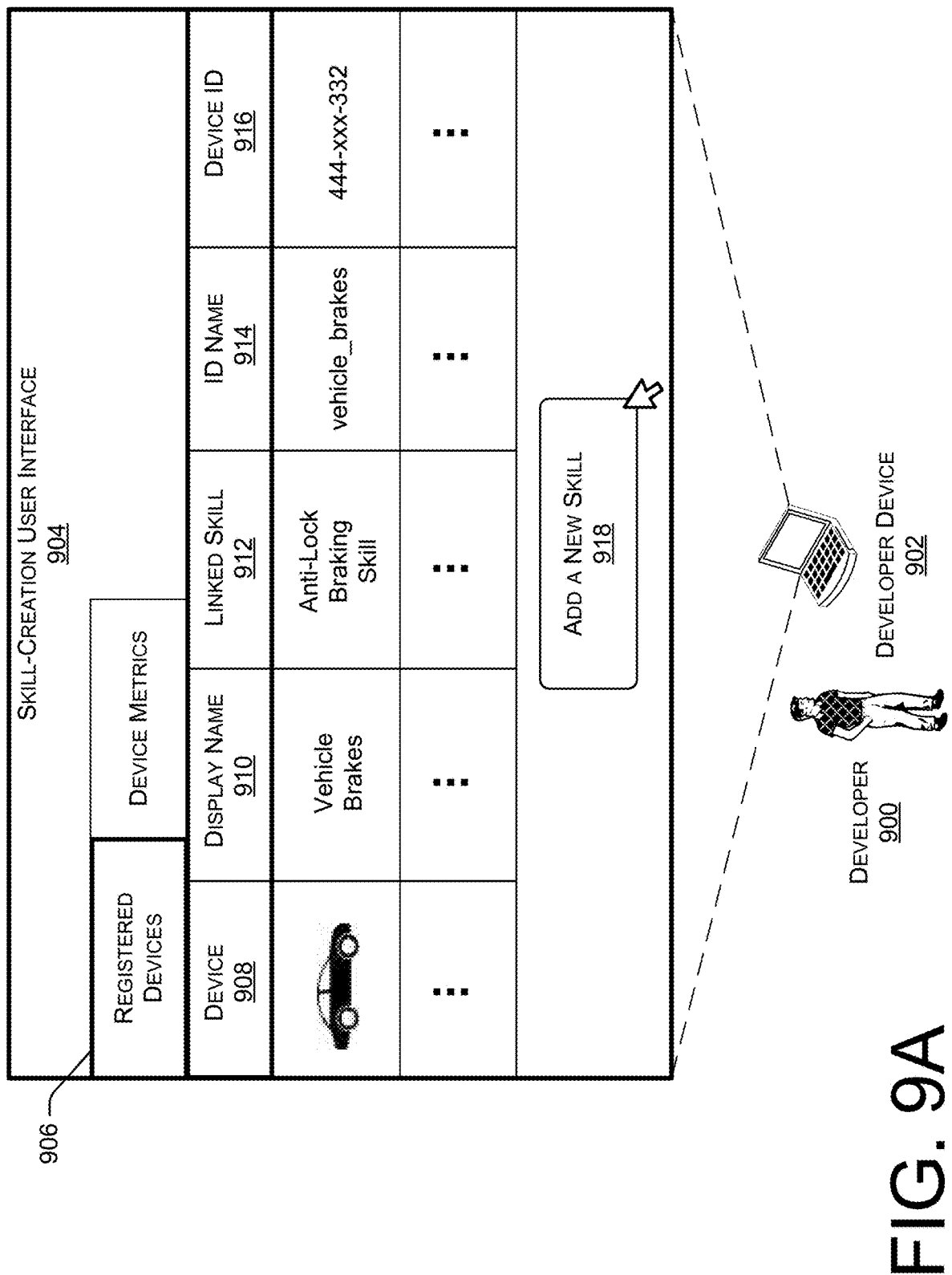
FIGS. 9A-9E illustrate example skill creation user interfaces associated with a remote speech-processing system through which a developer may create a new skill interface, and specify directives, events, and authorizations for the skill interface.

FIG. 9A illustrates an example skill-creation user interface 904 that a developer 900 may access, such as by a website (e.g., log into an account associated with the remote system 114), and provide input using a developer device 902. As illustrated, the skill-creation user interface 904 includes an indication of registered devices 906 that the developer 900 may have already associated with a developer profile registered with the remote system 114. For instance, the developer 900 may have a third-party developer profile, or a first-party developer profile, registered with the remote system 114. The skill-creation user interface 904 shows registered devices 908, display names 910 for those devices, linked skills 912 for the devices, ID names, and device IDs. As shown, the developer 900 may have a third-party profile which already has a registered device 906, name vehicle brakes, with a linked skill 912 of an anti-lock braking skill, an ID name 914 of vehicle brakes, and a device ID of 44-xxx-332. Thus, one or more specific device IDs are linked to a linked skill 912 that may correspond to a skill interface 128 created by a third-party developer 302. The skill-creation user interface 904 further includes an input mechanism, such as a clickable button 918, by which the developer 900 may provide input via their developer device 902 that they would like to add a new skill 918 for their developer profile (e.g., create a new skill interface 128).

Figure 9B:
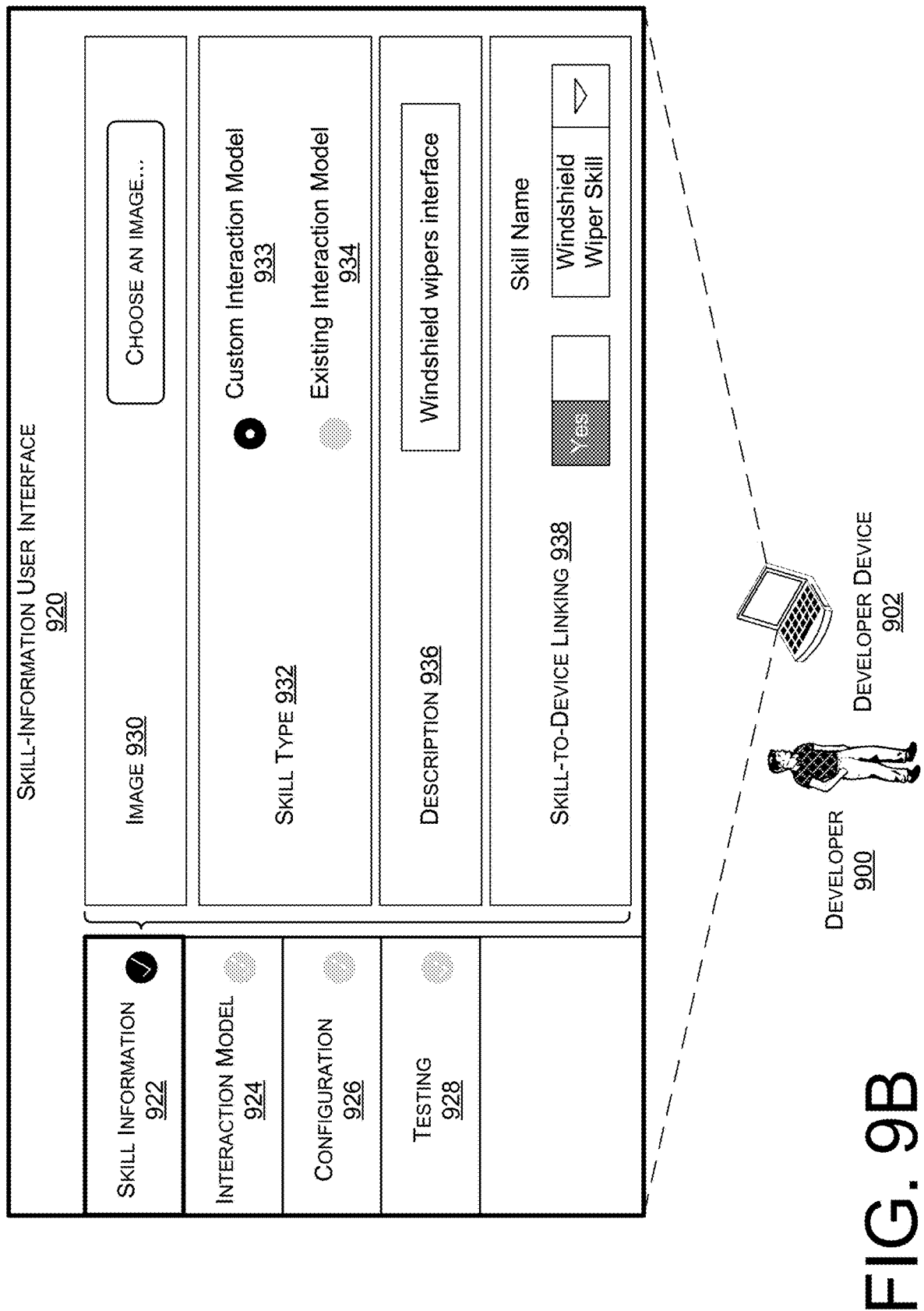

FIG. 9B illustrates an example skill-information user interface 920 to receive input data specifying details for the skill interface 128. In some examples, upon receiving the input via the add new skill 918 button, the skill-information user interface 920 may be presented on a display of the developer device 902. The skill-information user interface 920 includes a skill information tab 922, an interaction model tab 924, a configuration tab 926, and a testing tab 928. When the skill information tab 922 is selected, various types of data and/or input fields may be presented via the skill-information user interface 920 and on a display of the developer device 902. For example, an image field 930 may be presented through which the developer 900 may choose an image to upload to represent their device and/or skill (e.g., a picture of windshield wipers), a skill type field 932 where the developer 900 may indicate whether this skill interface 128 is for a custom interaction model 933, or an existing interaction model 934, for their device 108. When developing a new skill interface 128, the developer 900 may provide input into the skill type field 932 which indicates they are creating a custom interaction model 933. Further, the skill-information user interface 920 may include a description field 936 through which the developer 900 may provide a description of their skill interface 128 they are creating (e.g., "Windshield wipers interface"). Further, the skill-information user interface 920 may include a skill-to-device linking field 938 configured to receive input indicating whether or not the developer 900 would like to allow the new skill interface 128 to be linked to specific devices.

Figure 9C:
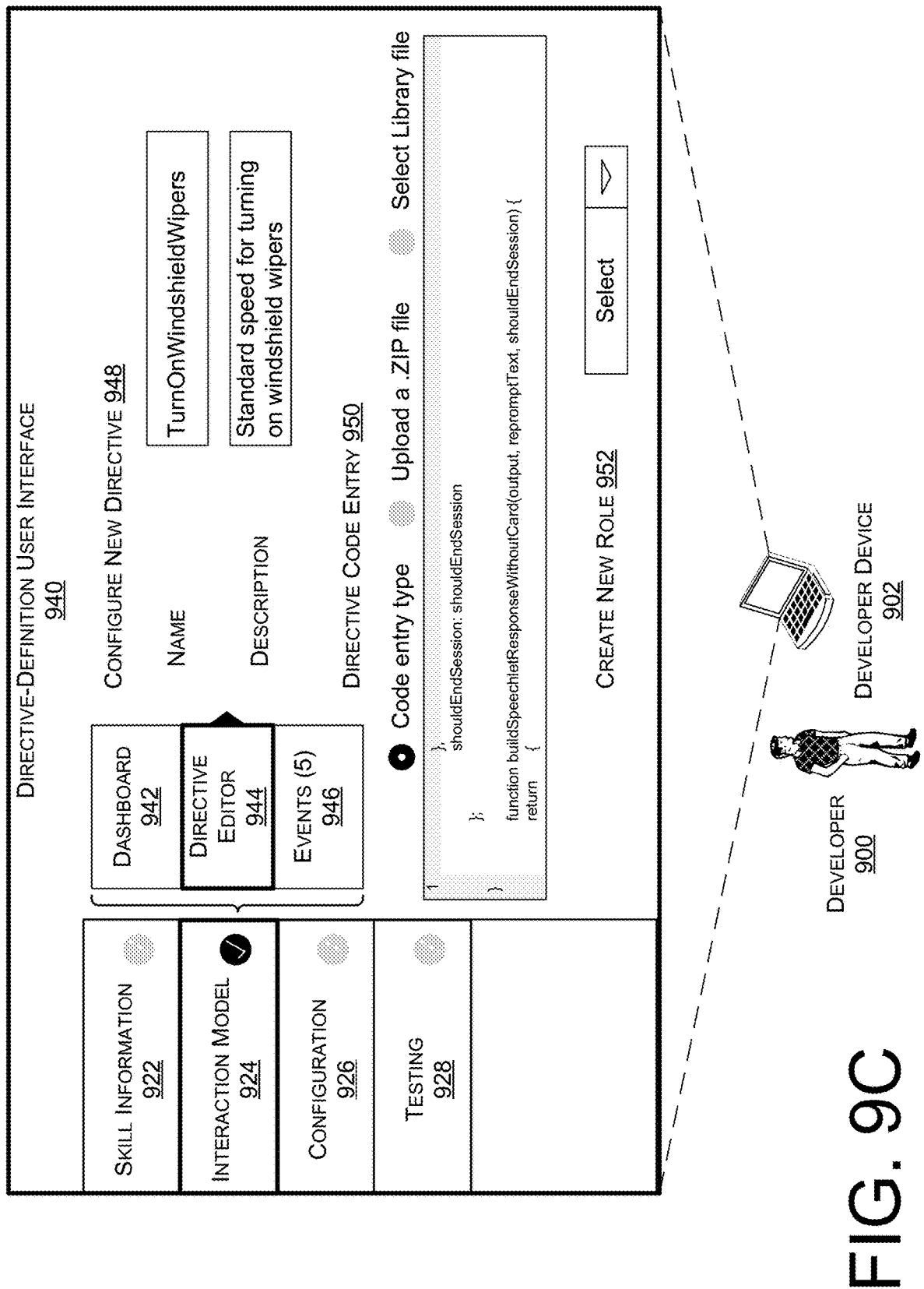

FIG. 9C illustrates an example directive-definition user interface 940 that the developer may use to define their directives 132. For example, once the developer 900 has provided information to the skill-information user interface 920, the developer 900 may be presented with, via their developer device 902, a directive-definition user interface 940. For instance, the directive-definition user interface 940 may be presented on the developer device 902 in response to receiving a selection of the interaction model tab 924. The directive-definition user interface 940 generally includes one or more input means by which the developer defines their directive(s) 132 for their skill interface 128. For instance, selection or other navigation to the interaction model tab 924 results in a dashboard tab 942, a directive editor tab 944, and an events tab 946 being presented on the directive-definition user interface 940. The dashboard tab 942, although not depicted, may allow the developer 900 to view, various high level data, such as a number of their built-in event(s) 130 (e.g., remote system 114 provided event(s) 130), and/or a number of their custom event(s) 130 (e.g., developer 900 specific event(s) 130). The directive editor 944 may include various fields and input components by which the developer 900 may edit and/or create their directive(s) 132. As shown, a configure new directive field 948 may include an input field where the developer 900 can specify a name of the directive (e.g., "TurnOnWindshield-Wipers"), and also a description field where the developer 900 can specify a description of the new directive 132 (e.g., "Standard speed for turning on windshield wipers"). Further, the directive-definition user interface 940 may include a directive code entry input field 950 through which the developer 900 may specify the pay-load for their directive(s) 132. The developer 900 may input their directive(s) 132 using various means or methods. As illustrated, the developer 900 may utilize their developer device 902 to select a "Code entry type" entry method where the developer manually types in their code (e.g., JSON code), an "Upload a .ZIP file" entry method where the developer 900 uploads a file containing their directive 132 code (e.g., JSON file, JSON .ZIP file, etc.), and/or a "Select library file" entry method where the developer 900 may select a file from a library of existing directive 132 code provided by the remote system 114 and/or existing files associated with a developer profile of the developer 900. However, any type of method or means for receiving code defining their directive(s) 132 may be used via the directive-definition user interface 940. While the code described herein as defining the directive(s) 132 is referred to as being the in the JSON format, any type of machine-readable and/or human-readable code or text may be used to define the directive(s) 132. Further, the developer 900 may create a new role 952 for the directive(s) 132 they are defining using the directive-definition user interface 940. Generally, creating a new role 952 for the directive(s) 132 defines the resources provided by the remote system 114 that the directive(s) 132 may access. Once the developer 900 has provided the code defining their directive(s) 132 via the directive-definition user interface, the developer may save the directive(s) and select the events tab 946, or be taken to the events tab 946 responsive to completing the directive(s) 132.

Figure 9D:
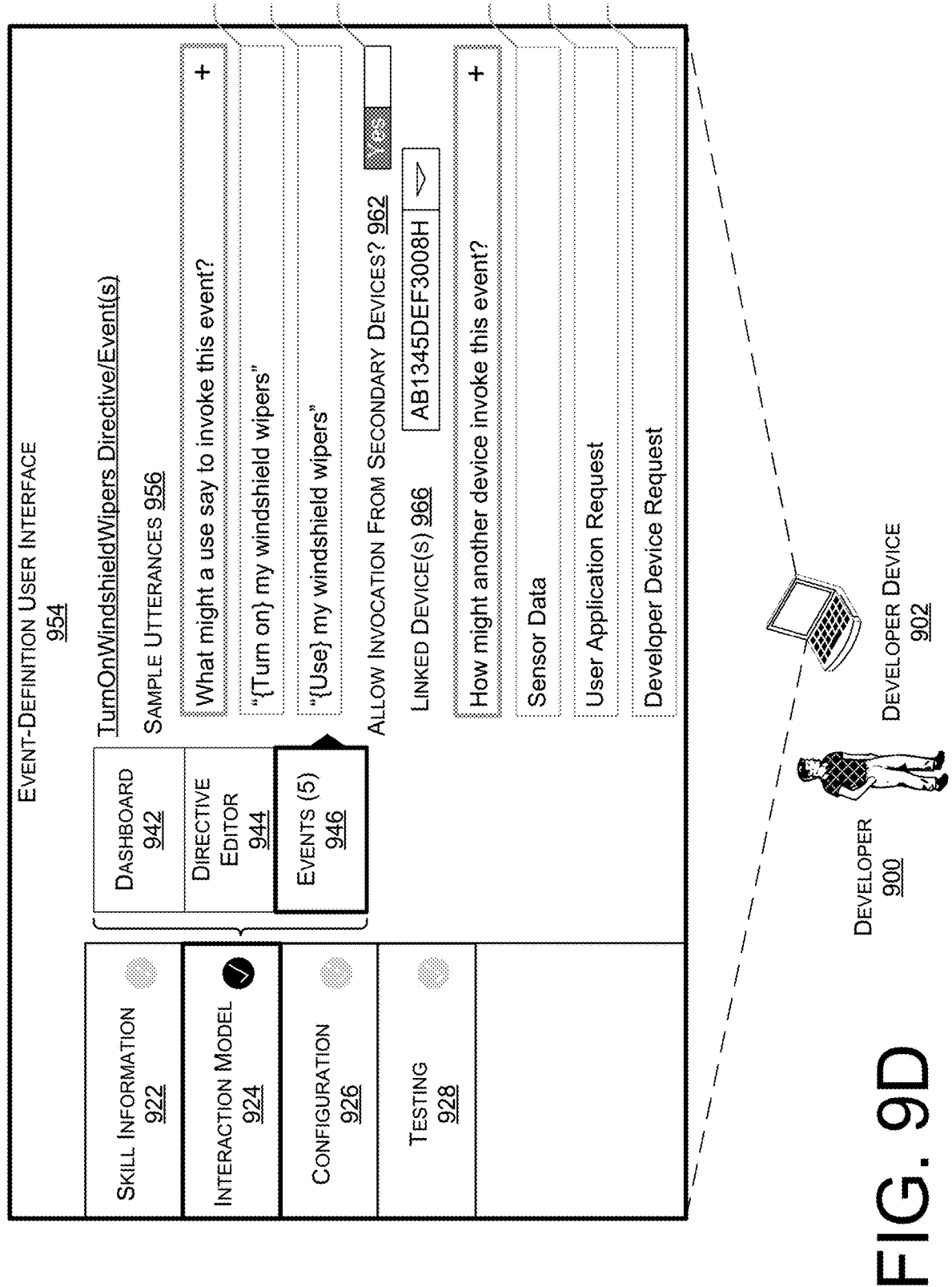

FIG. 9D illustrates an example event-definition user interface 954 through which the developer 900 may specify their event(s) 130. As described herein, event(s) 130 described with reference to the events tab 946 may, among other types of event(s) 130, correspond to intents determined by the remote system 114 for voice commands 110. The event-definition user interface 954 may provide various input mechanisms or fields through which the developer 900 specifies their event(s) 130 which correspond to the directive(s) 132 created using the directive editor 944. For instance, the event-definition user interface 954 may include a sample utterances field 956 where the developer 900 may input speech utterances, e.g., corresponding to a voice command 110, that map to event(s) 130 (e.g., map to intents that are event(s) 130). For example, the developer 900 may specify that "Turn on my windshield wipers" utterance 958 and "Use my windshield wipers" utterance 960 may be utterances, e.g., voice commands 110, which map to an event 130 that is in turn mapped to the directive(s) 132 created using the directive editor tab 944. The remote system 114 may store indications of that the utterances 958 and 960 are voice commands 110 which map to an event 130 that maps to the directive(s) 132 created in the directive editor tab 944.

Further, the event-definition user interface 954 may include an allow invocation from secondary devices field 962 where the developer 900 may select, using an input control 964, whether or not the developer 900 would like to allow secondary devices to invoke the event 130 defined in the event-definition user interface 954. In some examples, the field 962 may further include a linked device(s) list 966 which indicates device IDs for secondary devices which are allowed to invoke the event 130. In some examples, secondary devices may comprise sensors associated with the third-party developer device 108, user mobile devices associated with the third-party developer device 108 (e.g., application to turn on a vehicle), developer devices 902 associated with the third-party developer device 108, and so forth. As shown, sensor data 968 may be defined as an event 130 which maps to the directive 132 previously created. In the example of a directive 132 to turn on windshield wipers, the sensor data 968 may indicate that a moisture sensor associated with a vehicle computing device 108 has detected moisture on the windshield, and thus an event 130 has occurred based on the sensor data 968 which maps to the directive 132 to turn on the windshield wipers.

In some examples, a user application request event 970 may be defined where a user of a third-party device 108 may provide input using a user application on a user device (e.g., mobile phone) indicating that the user is triggering the event 970. For instance, in the example of a directive 132 being defined that turns on a vehicle 108, the user may use the user application executing on their user device to generate a user application request to turn on their car which corresponds to a user application request event 970 that maps to the directive 132 to turn on their car. Thus, a user device may be a secondary device which invokes an event 130 and corresponding directive 132. In some examples, the events 130 specified in the event-definition user interface 954 may include a developer device request event 972. For example, a third-party developer 302 may push a developer device request to the remote system 114, where the developer device request is mapped to the developer device request event 972. As an example, the third-party developer 302 may determine, e.g., estimate times that the user of the third-party device 108 is to change their oil in their vehicle based on driving habits. Thus, the third-party-developer 302 may push the developer device request from a third-party developer device 902 to the remote system 114, which is mapped to the developer device request event 130, which is in turn mapped to the directive 132 for turning on a "check-oil" indicator/light in the vehicle 108, and/or for scheduling an oil change for the user of the vehicle 108. In this way, the developer 900 may specific various events 130 which map to their created directive 132, and also allow secondary devices to invoke the events.

In some examples, certain types of devices 108 may not be allowed to have secondary device invoke their event(s) 130 and corresponding directive(s) 132. As an example, a developer may wish to voice-control an oven as a third-party device 108. The oven may have a skill interface 128 which allowed the user to issue a voice command 110 to turn on the oven 108 to a specific temperature (e.g., "Turn on my over to 350 degrees"). For safety reasons, this specific intent/event 130 is something that a user should only be allowed to speak to their oven 108, but not to other secondary devices, to prevent their oven 108 from turning on accidently when the user is not near the oven 108. Thus, in some examples, the developer 900 may use the input control 964 to indicate that "No", secondary devices should not be allowed to invoke this event 130 of turning on an oven 108. Thus, only the oven 108 device itself may be able to invoke this event 108 and directive 132 to turn on the oven 132, and not other voice-enabled devices 106 associated with the remote system 114. However, a voice command 110 of "What is the temperature of the oven" that is captured by a secondary voice-enabled deice 108 may map to an event 130 that causes a directive 132 to generate a response indicating that the over 108 is currently at 350 degrees. Thus, the developer 900 may provide input, using the developer device 902, into the event-definition user interface 954 in order to create or define events(s) 130 which invoke or map to the previously created directive(s) 132 for their new skill interface 128.

Figure 9E:
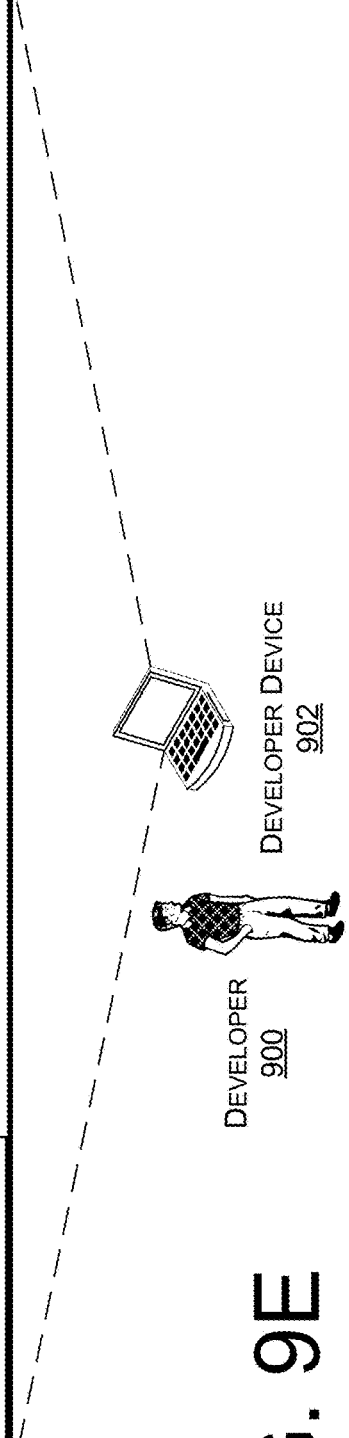

FIG. 9E illustrates an example configuration user interface 974 through which the developer 900 may configure their skill interface 128. For example, once the developer 900 has finished defining their event(s) 130 and corresponding directive(s) 132, the developer may navigate to the configuration tab 926, or otherwise be presented with the configuration user interface 974 on a display of the developer device 902. The configuration user interface 974 may include various fields or input mechanisms by which the developer may configure how the skill interface 128 is configured, and who is authorized to use the skill interface 128. For instance, the configuration user interface 974 may include an endpoint field 976 which indicates a type of the service endpoint (e.g., a remote system resource hosted by the remote system 114, an HTTPS resource hosted at a different website, etc.). If the developer 900 chooses to have their skill interface 128 hosted by a remote system resource of the remote system 114, the developer 900 then selects a geographic region closest to targeted users of their devices 108.

Further, the configuration user interface 974 may include an authorizations field 978 through which the developer 900 may designate who, if anyone, is authorized to access and use their skill interface 128. As shown, the types of authorizations in the authorizations field 978 that the developer 900 may enable for their skill interface 128 include various types of authorizations, including but not limited to, vendor account authorizations (e.g., certain vendor accounts may use the skill interface 128), device ID authorizations (e.g., lists of authorized device IDs), device capability authorizations (e.g., if the device has the capability to use the skill interface 128, it may do so), device skill authorizations, etc. The developer 900 may then save their changes and move onto testing 928 of their skill interface 128 they created.

Figure 10:
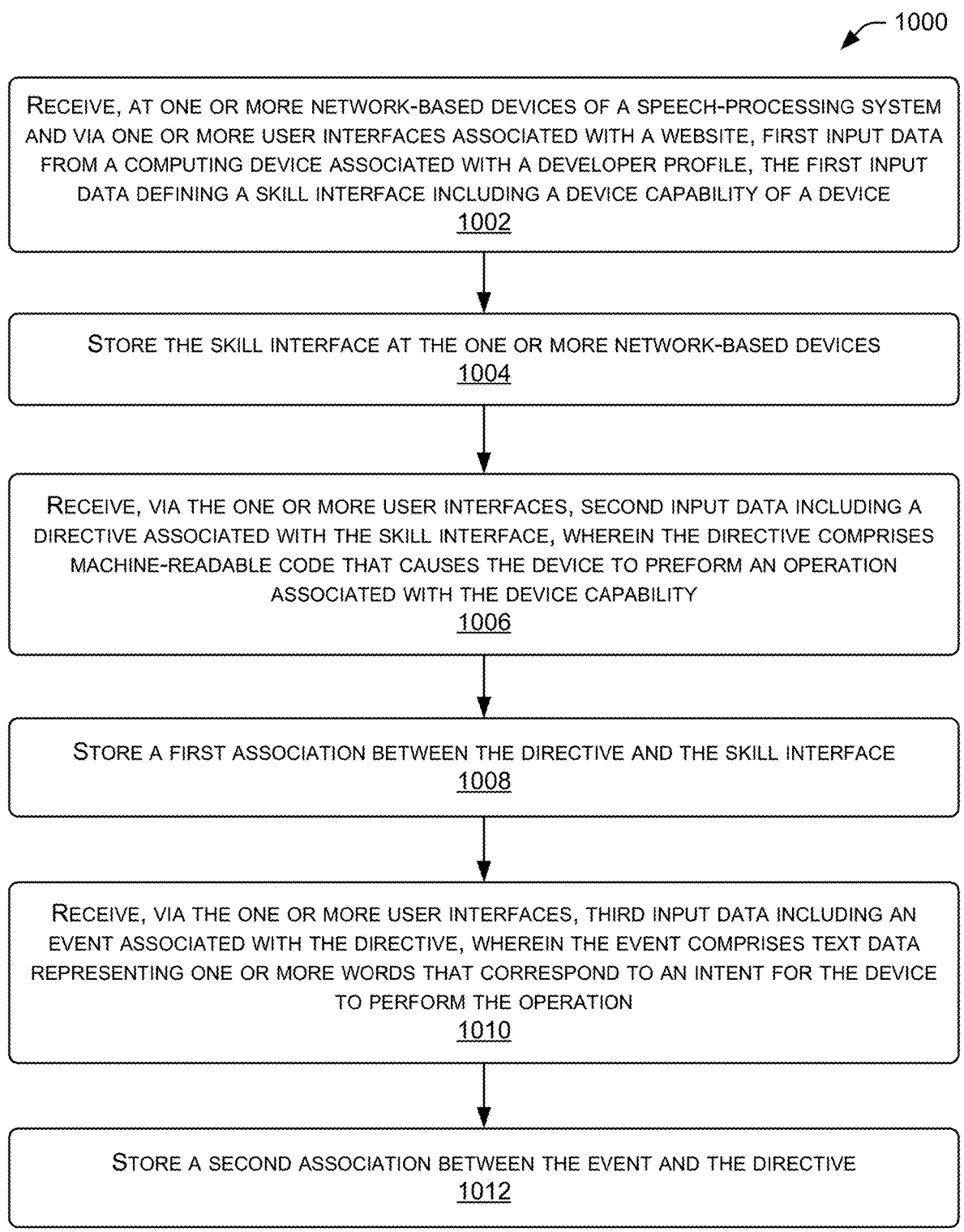
FIG. 10 illustrates a flow diagram of an example method for a developer profile to use one or more user interfaces to create a skill interface.

FIG. 10 illustrates a flow diagram of an example method 1000 for a developer 900, using a developer profile, to use one or more user interfaces to create a skill interface.

At 1002, one or more network-based devices of a speech-processing system (e.g., remote system 114) may receive, via one or more user interfaces, first input data from a computing device (e.g., developer device 902) associated with a developer profile. In some examples, the first input data may define a skill interface 128 including a device capability of a device (e.g., third-party device 108) associated with the developer profile. For example, the developer 900 may log in using his developer profile, and provide input using the developer device 902 to the skill-creation user interface 904 and/or the skill-information user interface 920 to define their skill interface 128 including a skill/capability type 932 and/or a description 936 of the skill (among other information). In some examples, the one or more user interfaces may be hosted on a website associated with the remote system 114.

At 1004, the one or more network-based devices may store the skill interface at the one or more network-based devices. For instance, the skill-interface creation component 122 may store the interface at 308 in the skill interfaces database 128.

At 1006, the one or more device-based devices may receive, via the one or more user interfaces associated with the website and from the computing device associated with the developer profile, second input data including a directive 132 associated with the skill interface 128. In some examples, the directive 132 comprises machine-readable code (e.g., JSON code/data) that causes the device 108 to perform an operation (e.g., turn on windshield wipers, speed up or down windshield wipers, etc.) associated with the device capability. In some examples, the one or more user interfaces may correspond to the directive-definition user interface 940, and the second input data may be input using the directive code entry field 950.

At 1008, the one or more network-based computing devices may store a first association between the directive 132 and the skill interface 128. For instance, the one or more network-based computing devices may store the directive 132 along with, or as part of, the skill interface 128 in the skill interfaces database 128. The directive 132 may be mapped to or otherwise indicated as part of the skill interface 128.

At 1010, the one or more network-based computing devices may receive, via the one or more user interfaces associated with the website and from the computing device associated with the developer profile, third input data including an event associated with the directive. For example, the one or more network-based computing devices (e.g., remote system 114) may receive the third input data via the event-definition user interface 954 that indicates one or more events 130. In some examples, the event 130 may comprise text data representing one or more words the correspond to an intent for the device 108 to perform the operation. For example, the event 130 may comprise sample utterances 956 that correspond to voice commands 110 of a user 104. For instance, a voice command 110 of the user 104 may be included in the audio data 600, and the speech-processing component 142 may determine whether or not words in the voice command 110 of the user 104 in the audio data 600 correspond to the one or more words of the sample utterances 958/960 provided as events 130 using the sample utterances field 956 of the event-definition user interface 954. In some examples, the event(s) 130 may additionally, or alternatively, comprise events invoked from secondary devices. For instance, the events 130 may comprise an indication of sensor data that indicates that the one or more network-based devices are to generate the directive if corresponding sensor data is received from sensors associated with the device 108. The event(s) 130 may comprise user application request data 970 generated by an application executing on a user device (e.g., mobile phone, tablet, etc.) of the user 104. For instance, the third-party developer 302 and/or first-party developer 306 may provide applications to download onto user devices through which the user 104 may send event data to cause the one or more network-based devices to generate the directive. In such examples, the user device executing the application may also be associated with a same user profile as the first device that is controlled by the directive 132. Further, the event(s) 130 may comprise a developer device request 972 where event data is defined that corresponds to a request from the developer profile to generate the directive 132. For example, if one or more computing devices associated with the developer 900 sends event data indicating a request to generate a directive (e.g., a request to cause an oil light in the user's 104 vehicle to light up), the one or more network-based computing devices may determine that the request corresponds to stored event data of the developer device request 972 and generate the directive 132.

At 1012, the one or more network-based devices may store a second association between the event 130 and the directive 132. For example, the event 130 and directive 132 may be mapped to each other in memory of the remote system 114. As an example, the event 130 and directive 132 may be stored as part of the skill interface 128 stored by the skill-interface creation component 122 at 308 in FIG. 3

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising: one or more processors; and computer-readable media storing computer-executable instructions that, when executed by the one or more processors, cause the one or more processors to perform operations comprising: receiving, at a speech-processing system and via a first user interface associated with a website, first input data from a computing device associated with a developer profile, the first input data selecting a device capability of multiple device capabilities for a device to be utilized in association with a skill interface, the device capability associated with the developer profile, the device capability indicating a physical component operable by the computing device; storing the skill interface at the speech-processing system; receiving, via a second user interface associated with the website and from the computing device, second input data including a directive associated with the skill interface and the directive based at least in part on the device capability as selected, wherein directive data corresponding to the directive comprises machine-readable code that causes the device to perform an operation of the operations associated with the device capability; storing a first association between the directive and the skill interface at the speech-processing system; receiving, via a third user interface associated with the website and from the computing device, third input data including an event associated with the directive, wherein the event indicates an intent for the device to perform the operation; storing a second association between the event and the directive at the speech-processing system; receiving, over a network and from a voice-enabled device, audio data representing a speech utterance; performing speech-recognition on the audio data at the speech-processing system; determining, at the speech-processing system, that the speech utterance indicates the event; generating the directive data; and sending, from the speech-processing system, the directive data to the voice-enabled device for sending to the device.

2. The system of claim 1, wherein the event comprises a first event, and the operations further comprising:
   receiving, via the third user interface associated with the website, fourth input data comprising a second event associated with the directive, wherein the second event comprises an indication of sensor data obtained by a sensor associated with the device that, when received at the speech-processing system, causes the speech-processing system to generate the directive data; and
   storing, at the speech-processing system, a third association between the second event and the directive.

3. The system of claim 1, the operations further comprising:
   receiving, via a fourth user interface associated with the website, fourth input data comprising authorization data including at least one of a vendor account indicator, a device indicator, or a device capability indicator that, when received from a secondary device, authorizes the secondary device to use the skill interface; and
   storing, at the speech-processing system, a third association between the authorization data and the skill interface.

4. A method comprising: receiving, at a speech-processing system and via one or more user interfaces, first input data from a computing device associated with a user profile, the first input data: defining a skill interface; and selecting a device capability of multiple device capabilities of a first device to be utilized in association with a skill interface, the device capability associated with the user profile, the device capability indicating a physical component operable by the first device; storing the skill interface at the speech-processing system; receiving, at the speech-processing system and via the one or more user interfaces, second input data including a directive associated with the skill interface, directive data corresponding to the directive configured to cause the first device to perform an operation of the operations associated with the device capability; storing, in the speech-processing system, a first association between the directive and the skill interface; receiving, at the speech-processing system and via the one or more user interfaces, third input data including an event that causes the speech-processing system to generate the directive data; and storing, in the speech-processing system, a second association between the event and the directive.

5. The method of claim 4, wherein the event comprises text data representing one or more words that correspond to an intent for the first device to perform the operation, the method further comprising:
   receiving, over a network and from at least one of the first device or a second device in an environment of the first device, audio data representing a speech utterance captured by a microphone of the at least one of the first device or the second device, the at least one of the first device or the second device being remote from the speech-processing system;
   performing speech-recognition on the audio data to determine that the speech utterance corresponds to the one or more words;
   generating the directive data based at least in part on the speech utterance corresponding to the one or more words; and
   sending the directive data from the speech-processing system to the at least one of the first device or the second device.

6. The method of claim 4, wherein the event comprises an indication of first sensor data that indicates that the speech-processing system is to generate the directive data, and the method further comprising:
   receiving second sensor data obtained by one or more sensors associated with the first device;
   determining that the second sensor data corresponds to the first sensor data;
   generating the directive data based at least in part on the second sensor data corresponding to the first sensor data; and
   sending the directive data to at least one of the first device or a second device in an environment of the first device.

7. The method of claim 4, further comprising:
   causing, by the speech-processing system, a first user interface of the one or more user interfaces to be presented on a display of the computing device associated with the user profile, wherein the first input data defining the skill interface is received via the first user interface;
   causing, by the speech-processing system, a second user interface of the one or more user interfaces to be presented on the display of the computing device associated with the user profile, wherein the second input data including the directive is received via the second user interface; and
   causing, by the speech-processing system, a third user interface of the one or more user interfaces to be presented on the display of the computing device associated with the user profile, wherein the third input data including the event is received via the third user interface.

8. The method of claim 7, further comprising:
   receiving, via the one or more user interfaces, first text data comprising one or more first words that correspond to an intent for the first device to perform the operation;
   storing a third association between the first text data and the directive;
   receiving, via the one or more user interfaces, second text data comprising one or more second words that correspond to the intent for the first device to perform the operation; and
   storing a fourth association between the second text data and the directive.

9. The method of claim 4, further comprising:
   receiving, via the one or more user interfaces, fourth input data including a JavaScript Object Notation (JSON) file, the JSON file configured to cause the first device to perform the operation;
   storing the JSON file at the speech-processing system;
   receiving event data corresponding to the event;
   at least partly in response to receiving the event data, generating a packed JSON file corresponding to the JSON file; and
   sending, prior to the packed JSON file being unpacked, the packed JSON file to at least one of the first device or a second device in an environment of the first device.

10. The method of claim 4, further comprising:
    receiving, via the one or more user interfaces, fourth input data comprising at least one of a vendor account indicator, a device indicator, or a device capability indicator that, when received from a secondary device, authorizes the secondary device to use the skill interface; and storing, at the one or more user interfaces, a third association between the fourth input data and the skill interface.

11. The method of claim 4, further comprising:
receiving event data corresponding to the event;
at least partly in response to receiving the event data, generating the directive data; and
prior to sending the directive data to at least one of the first device or a second device in an environment of the first device:
sending the directive data to a third device of a third-party directive validation system;
receiving, from the third-party directive validation system, an indication that the directive data comprises a valid directive for causing the first device to perform the operation; and
sending the directive data to the at least one of the first device or the second device at least partly responsive to receiving the indication that the directive comprises the valid directive.

12. The method of claim 4, further comprising:
receiving, from one or more computing devices associated with the user profile, event data;
determining that the event data corresponds to the event;
generating the directive data based at least in part on the event data corresponding to the event; and
sending the directive data to at least one of the first device or a second device in an environment of the first device.

13. A system comprising: one or more processors; and computer-readable media storing computer-executable instructions that, when executed by the one or more processors, cause the one or more processors to perform operations comprising: receiving, via one or more user interfaces and at a speech-processing system, first input data from a computing device associated with a user profile, the first input data identifying a capability of multiple capabilities that a first device is enabled for to be utilized in association with a skill interface and a directive configured to cause the first device to perform an operation associated with the capability of the first device, the capability indicating a physical component operable by the first device; receiving, via the one or more user interfaces and at the speech-processing system, second input data from the computing device associated with the user profile, the second input data comprising an event associated with the first device performing the operation; and storing, in the speech-processing system, an association between the event and the directive.

14. The system of claim 13, wherein the event comprises text data representing one or more words that correspond to an intent for the first device to perform the operation, the operations further comprising:
receiving, over a network and from at least one of the first device or a second device in an environment of the first device, audio data representing a speech utterance captured by a microphone of the at least one of the first device or the second device, the at least one of the first device or the second device being remote from the speech-processing system;
performing speech-recognition on the audio data to determine that the speech utterance corresponds to the one or more words;
generating directive data corresponding to the directive based at least in part on the speech utterance corresponding to the one or more words; and
sending the directive data to the at least one of the first device or the second device.

15. The system of claim 13, wherein the event comprises an indication of first sensor data that indicates that the speech-processing system is to generate the directive data, and the operations further comprising:
receiving second sensor data obtained by one or more sensors associated with the first device;
determining that the second sensor data corresponds to the first sensor data;
generating the directive data based at least in part on the second sensor data corresponding to the first sensor data; and
sending the directive data to at least one of the first device or a second device in an environment of the first device.

16. The system of claim 13, wherein:
the event comprises first request data generated by a software application associated with the user profile, the first request data indicating that the speech-processing system is to generate the directive data;
the first device is associated with a user profile, and the operations further comprising:
receiving second request data from a user device associated with the user profile, the second request data being generated by the software application executing on the user device;
determining that the second request data corresponds to the first request data;
generating the directive data based at least in part on the second request data corresponding to the first request data; and
sending the directive data to at least one of the first device or a second device in an environment of the first device.

17. The system of claim 13, wherein the association comprises a first association, and the operations further comprising:
receiving, via the one or more user interfaces, first text data comprising one or more first words that correspond to an intent for the first device to perform the operation;
storing a second association between the first text data and the directive;
receiving, via the one or more user interfaces, second text data comprising one or more second words that correspond to the intent for the first device to perform the operation; and
storing a third association between the second text data and the directive.

18. The system of claim 13, the operations further comprising:
receiving, via the one or more user interfaces, third input data including JavaScript Object Notation (JSON) data, the JSON data configured to cause the first device to perform the operation;
storing the JSON data at the speech-processing system;
receiving event data corresponding to the event;
at least partly in response to receiving the event data, generating a packed JSON file corresponding to the JSON data; and
sending, prior to the packed JSON file being unpacked, the packed JSON file to at least one of the first device or a second device in an environment of the first device.

19. The system of claim 18, the operations further comprising, prior to sending the packed JSON file to the at least one of the first device or the second device:
sending the packed JSON file to a third device of a directive validation system;

receiving, from the directive validation system, validation data indicating that the packed JSON file comprises a valid directive for causing the first device to perform the operation, and wherein sending the packed JSON file to the at least one of the first device or the second device is performed at least partly responsive to receiving the validation data.

20. The system of claim 13, the operations further comprising:

receiving, from at least one of the first device or a second device, event data corresponding to the event;

receiving, from the at least one of the first device or the second device, authorization data comprising at least one of a vendor account indicator, a device indicator, or a device capability indicator associated with the at least one of the first device or the second device;

determining, based at least in part on the authorization data, that the at least one of the first device or the second device is authorized to receive the directive data;

generating the directive data, wherein the directive data comprises machine-readable code that causes the first device to perform the operation; and sending the directive data to the at least one of the first device or the second device.

21. The method of claim 4, wherein the event comprises text data representing one or more words that correspond to an intent for the first device to perform the operation, further comprising:

storing, in a first storage location accessible by a natural language understanding (NLU) component of the speech-processing system, a third association between the text data and intent data corresponding to an intent that the first device performs the operation; and storing, in a second storage location accessible by a command-processor component of the speech-processing system, a fourth association between the intent data and the directive.

* * * * *

UNITED STATES PATENT AND TRADEMARK OFFICE
CERTIFICATE OF CORRECTION

PATENT NO. : 11,295,735 B1
APPLICATION NO. : 15/840457
DATED : April 5, 2022
INVENTOR(S) : Raphael Adam Anuar et al.

It is certified that error appears in the above-identified patent and that said Letters Patent is hereby corrected as shown below:

On the Title Page

Item (73), change "Seatlle" to --Seattle--.

In the Claims

Column 39, Line 31, change "association with a" to --association with the--.

Signed and Sealed this
Twenty-fourth Day of May, 2022

Katherine Kelly Vidal
*Director of the United States Patent and Trademark Office*